United States Patent
Yuan et al.

(10) Patent No.: US 10,014,916 B2
(45) Date of Patent: Jul. 3, 2018

(54) 2D ACTIVE ANTENNA ARRAY OPERATION FOR WIRELESS COMMUNICATION SYSTEMS

(71) Applicant: Samsung Electronics Co., Ltd., Suwon-si, Gyeonggi-do (KR)

(72) Inventors: Jin Yuan, Richardson, TX (US); Yang Li, Plano, TX (US); Young-Han Nam, Plano, TX (US); Ioannis Tzanidis, Dallas, TX (US); Gang Xu, Allen, TX (US); Md. Saifur Rahman, Richardson, TX (US); Yan Xin, Princeton, NJ (US); Robert Monroe, Melissa, TX (US); Jianzhong Zhang, Plano, TX (US); Eko Onggosanusi, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 121 days.

(21) Appl. No.: 14/935,172

(22) Filed: Nov. 6, 2015

(65) Prior Publication Data
US 2016/0135180 A1    May 12, 2016

Related U.S. Application Data

(60) Provisional application No. 62/077,795, filed on Nov. 10, 2014, provisional application No. 62/080,090, (Continued)

(51) Int. Cl.
H04W 72/04    (2009.01)
H04B 7/04    (2017.01)
(Continued)

(52) U.S. Cl.
CPC ............ H04B 7/043 (2013.01); H01Q 1/246 (2013.01); H01Q 3/2605 (2013.01);
(Continued)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS 7,209,078 B2    4/2007    Jin et al.
8,284,855 B2 *    10/2012    Khojastepour ...... H04B 7/0417
                                                            341/173
(Continued)

FOREIGN PATENT DOCUMENTS

EP    2775634    9/2014
EP    2869478 A1    5/2015
(Continued)

OTHER PUBLICATIONS

International Search Report and Written Opinion issued for PCT/KR2015/012075 dated Feb. 23, 2016, 10 pgs.
(Continued)

*Primary Examiner* — Mark Rinehart
*Assistant Examiner* — Sanjay K Dewan

(57) ABSTRACT

A method for operating a large scale antenna array in a wireless communication system includes receiving one or more signals. The one or more signals include information for beamforming to a plurality of user equipments (UEs) using a full-dimensional multiple-input multiple-output (FD-MIMO) beamforming scheme. The FD-MIMO beamforming scheme includes same time resources and same frequency resources that are co-scheduled to the plurality of UEs. The method further includes identifying a time delay of the one or more signals associated with one or more antenna
(Continued)

arrays that are distributed in the large scale antenna array and performing a multi-user (MU) joint beamforming on the one or more signals to one or more UEs.

20 Claims, 12 Drawing Sheets

Related U.S. Application Data filed on Nov. 14, 2014, provisional application No. 62/098,092, filed on Dec. 30, 2014.

(51) Int. Cl.

| | | |
|---|---|---|
| *H04B 7/0426* | (2017.01) | |
| *H04B 7/0452* | (2017.01) | |
| *H04B 7/06* | (2006.01) | |
| *H01Q 1/24* | (2006.01) | |
| *H01Q 3/26* | (2006.01) | |
| *H01Q 21/06* | (2006.01) | |
| *H01Q 21/22* | (2006.01) | |
| *H04B 7/0456* | (2017.01) | |
| *H04B 17/12* | (2015.01) | |
| *H04L 5/00* | (2006.01) | |

(52) U.S. Cl.
CPC .......... *H01Q 3/267* (2013.01); *H01Q 21/065* (2013.01); *H01Q 21/22* (2013.01); *H04B 7/0452* (2013.01); *H04B 7/0456* (2013.01); *H04B 7/0617* (2013.01); *H04B 7/0671* (2013.01); *H04B 17/12* (2015.01); *H04L 5/0048* (2013.01)

(56) References Cited

U.S. PATENT DOCUMENTS

| | | | | |
|---|---|---|---|---|
| 9,042,276 B1* | 5/2015 | Harel | ............ | H04J 3/1694 |
| | | | | 370/277 |
| 9,094,071 B2* | 7/2015 | Nandagopalan | ..... | H04B 7/0617 |
| 2010/0329236 A1* | 12/2010 | Sampath | .......... | H04W 56/0035 |
| | | | | 370/350 |
| 2011/0243272 A1* | 10/2011 | Hammarwall | ....... | H04B 7/0417 |
| | | | | 375/296 |
| 2012/0320885 A1* | 12/2012 | Hansen | ............... | H04B 7/0613 |
| | | | | 370/336 |
| 2013/0016680 A1* | 1/2013 | Au | ...................... | H04B 7/0452 |
| | | | | 370/329 |
| 2013/0258964 A1 | 10/2013 | Nam et al. | | |
| 2014/0098689 A1* | 4/2014 | Lee | ..................... | H04B 7/0469 |
| | | | | 370/252 |
| 2014/0242914 A1* | 8/2014 | Monroe | ................ | H04B 17/11 |
| | | | | 455/63.4 |
| 2014/0301492 A1 | 10/2014 | Xin et al. | | |
| 2014/0341048 A1* | 11/2014 | Sajadieh | ............... | H04L 5/0085 |
| | | | | 370/252 |
| 2016/0050002 A1* | 2/2016 | Wei | ...................... | H04B 7/0469 |
| | | | | 370/329 |
| 2016/0173250 A1* | 6/2016 | Kang | ................... | H04B 7/0617 |
| | | | | 370/329 |
| 2016/0205670 A1* | 7/2016 | Kakishima | ............. | H04B 7/04 |
| | | | | 370/280 |

FOREIGN PATENT DOCUMENTS

| | | |
|---|---|---|
| WO | WO2013147565 A2 | 10/2013 |
| WO | WO 2013/169389 | 11/2013 |
| WO | 2014007512 A1 | 1/2014 |

OTHER PUBLICATIONS

Nam et al., "Full-Dimension MIMO (FD-MIMO) for Next Generation Cellular Technology", IEEE Communications Magazine, vol. 51, No. 6, Jun. 2013, pp. 172-179.

Marzetta, "Noncooperative Cellular Wireless with Unlimited Numbers of Base Station Antennas", IEEE Transactions on Wireless Communications, vol. 9, No. 11, Nov. 2010, pp. 3590-3600.

Spencer et al., "Zero-Forcing Methods for Downlink Spatial Mutliplexing in Multiuser MIMO Channels", IEEE Transactions on Signal Processing, vol. 52, No. 2, Feb. 2004, pp. 461-471.

Sadek et al., "A Leakage-Based Precoding Scheme for Downlink Multi-User MIMO Channels", IEEE Transactions on Wireless Communications, vol. 6, No. 4, May 2007, pp. 1711-1721.

Golub et al., "Matrix Computations", Third Edition, The Johns Hopkins University Press, 1996, 723 pages.

Wang et al., "On equivalence of SLNR-based preceding and RBD preceding", Electronics Letters, vol. 48, No. 11, May 2012, 2 pages.

Extended European Search Report, dated Nov. 6, 2017, regarding Application No. 15858802.0, 14 pages.

\* cited by examiner

2D ACTIVE ANTENNA ARRAY OPERATION FOR WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/077,795 filed on Nov. 10, 2014, entitled "2D ACTIVE ANTENNA ARRAY OPERATION FOR WIRELESS COMMUNICATION SYSTEMS", U.S. Provisional Patent Application Ser. No. 62/080,090 filed on Nov. 14, 2014, entitled "METHODS AND APPARATUS FOR PRECODING DESIGN FOR LARGE SCALE ANTENNA WIRELESS SYSTEMS", and U.S. Provisional Patent Application Ser. No. 62/098,092 filed on Dec. 30, 2014, entitled "METHODS AND APPARATUS FOR PRECODING DESIGN FOR LARGE SCALE ANTENNA WIRELESS SYSTEMS." The content of the above-identified patent document is incorporated herein by reference.

TECHNICAL FIELD

The present application relates generally to wireless communication systems and, more specifically, to a 2 dimensional active antenna array operation for wireless communication systems.

BACKGROUND

A full dimensional-multiple input multiple output (FD-MIMO) system may support up to 64 antenna ports in a 2 dimensional (2D) array while providing enhanced performance. Therefore, the FD-MIMO system is considered as a key area in long term evolution (LTE) standardization. The FD-MIMO system may provide enhanced system performance without requiring a very higher performance backhaul or large frequency resources compared to a coordinated multipoint transmission and reception (COMP) and a carrier aggregation (CA) technique. However, there is a big challenge to accommodate a high-order multiuser MIMO (MU-MIMO) transmission and reception without complicating design and implementation of both base station and user equipment (UE) because the higher-order MU-MIMO refers to the use of a large number of antennas at the base station in order to transmit or receive spatially multiplexed signals to/from a large number of UEs.

SUMMARY

Embodiments of the present disclosure provide a 2D active antenna array operation for wireless communication systems.

In one embodiment, a method for operating a large scale antenna array in a wireless communication system is provided. The method includes receiving one or more signals. The one or more signals include information for beamforming to a plurality of user equipments (UEs) using a full-dimensional multiple-input multiple-output (FD-MIMO) beamforming scheme. The FD-MIMO beamforming scheme includes same time resources and same frequency resources that are co-scheduled to the plurality of UEs. The method further includes identifying a time delay of the one or more signals associated with one or more antenna arrays that are distributed in the large scale antenna array and performing a multi-user (MU) joint beamforming on the one or more signals to one or more UEs. An apparatus for performing this method is also provided.

In another embodiment, an apparatus for a user equipment (UE) is provided. The UE includes at least one transceiver configured to transmit an uplink signal to a base station (BS). The uplink signal comprises a channel quality indicator (CQI) information associated with a reference signal received from the BS. The UE further includes at least one transceiver configured to receive one or more antenna beams from at one or more antenna arrays associated with the BS using a full-dimensional multiple-input multiple out (FD-MIMO) beamforming scheme.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

Figure 1:
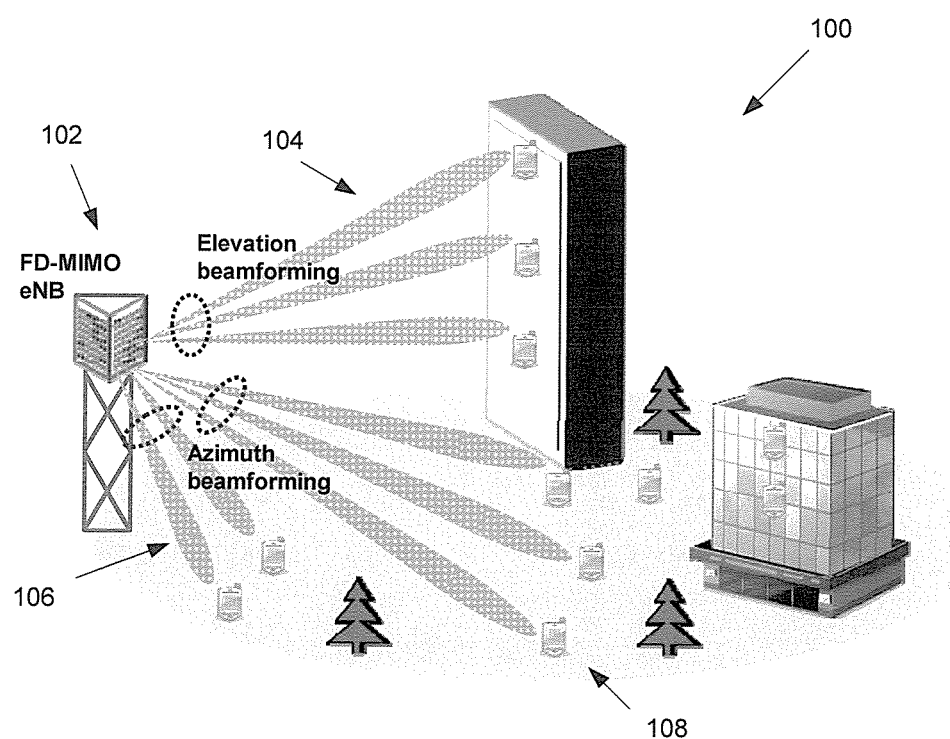
FIG. 1 illustrates an example configuration of a full-dimensional multiple input multiple output (FD-MIMO) system according to an exemplary embodiment of the disclosure.

FIG. 1 illustrates an example configuration of a full-dimensional multiple input multiple output (FD-MIMO) system 100 according to an exemplary embodiment of the disclosure. The embodiment of the FD-MIMO system 100 shown in FIG. 1 is for illustration only. Other embodiments of the FD-MIMO system 100 could be used without departing from the scope of this disclosure.

As illustrated in FIG. 1, the FD-MIMO system 100 comprises an FD-MIMO eNB 102, an elevation beamforming 104, an azimuth beamforming 106, and a plurality of user equipments (UEs) 108. Specifically, the FD-MIMO system 100 comprises a 2 Dimensional (D) antenna array plane that is deployed with much more antenna elements than traditional multiple antenna systems in a wireless communication system. The antenna elements allow dynamic and adaptive precoding to be performed jointly across all antennas. As a result of such precoding, the eNB 102 (such as base station) achieves more directional transmissions with the azimuth beamforming 106 and the elevation beamforming 104 simultaneously to the plurality of UEs 108.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

One or more of the components illustrated in FIG. 1 may be implemented in specialized circuitry configured to perform the noted functions, or one or more of the components may be implemented by one or more processors executing instructions to perform the noted functions.

Figure 2:
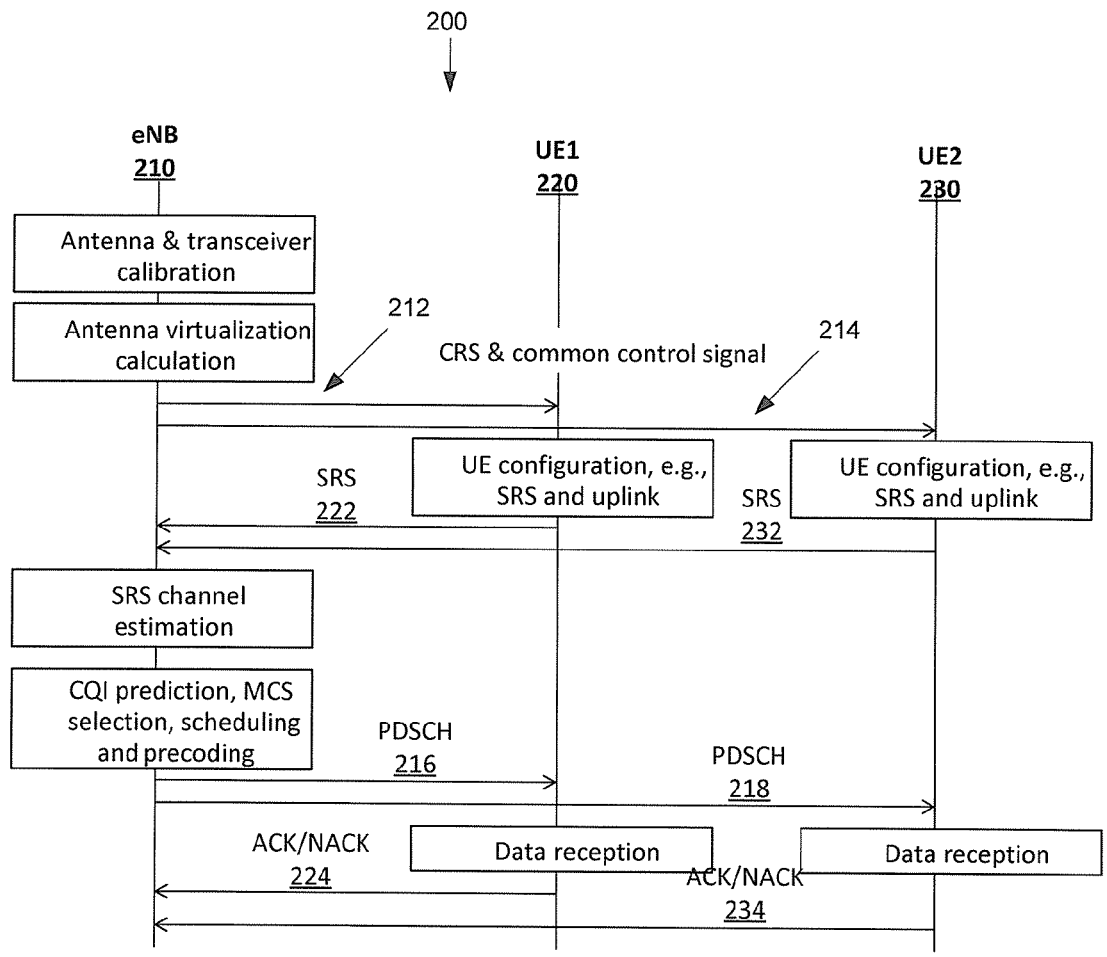
FIG. 2 illustrates an example message flow of an FD-MIMO system according to an exemplary embodiment of the disclosure.

FIG. 2 illustrates an example message flow of an FD-MIMO system 200 according to an exemplary embodiment of the disclosure. The embodiment of the FD-MIMO system 200 shown in FIG. 2 is for illustration only. Other embodiments of the FD-MIMO system 200 could be used without departing from the scope of this disclosure.

As illustrated in FIG. 2, the message flow of the FD-MIMO system 200 comprises an eNB 210, a UE1 220, a UE2 230, a plurality of common reference signal (CRS) and common control signals 212, 214, a sounding reference signal (SRS) 222 from the UE1 220, an SRS 232 from the UE2 230, a plurality of physical downlink shared channels (PDSCH) 216, 218, an acknowledge/negative acknowledge (ACK/NACK) signal 224 from the UE1 220, and an ACK/NACK signal from the UE2 230. The eNB 210 calibrates an antenna and a transceiver, and then calculate an antenna virtualization. The eNB sends the plurality of CRS and common control signal 212, 214 including the calculation results of the antenna virtualization to the UEs 220, 230. The UE1 220 and the UE2 230 configure a SRS and uplink channel for the eNB 210, respectively. The UE1 220 and the UE2 230 send the SRS to the eNB 210, respectively. After receiving the SRSs 222, 232 from the UE1 220 and the UE2 230, the eNB 210 estimates an SRS channel based on the SRS 222, 232 transmitted from the UE1 220 and UE2 230, and the eNB 210 performs a channel quality indication prediction, a modulation and coding scheme (MCS), a scheduling, and a precoding. The eNB 210 sends the plurality of PDSCHs 216, 218 to the UE1 220 and the UE2 230, respectively. The UE1 220 and the UE2 230 receive data transmitted on the PDSCH 216, 218, respectively. Finally, the UE1 220 and the UE2 230 send the ACK/NACK signals 224, 234, respectively, to the eNB 210.

The operations of FD-MIMO systems make a provision for achieving a higher data rate and a high-order multi-user MIMO (MU-MIMO) by utilizing a 2D antenna array. In certain embodiments, an FD-MIMO base station is deployed with 2D antenna array comprising of many more antenna elements than traditional multiple antenna systems. In such embodiments, the FD-MIMO system leads to the impressive improvement on system throughputs and supports the higher-order MU-MIMO.

In certain embodiments, an antenna array virtualization creates wide beams required for common control signals and broadcasting signals in a wireless communication system. Those common control signals and broadcasting signals include a cell-specific reference signal (CRS), a channel state information reference signal (CSIRS), a physical broadcast channel (PBCH), and a primary and secondary synchronization signals (PSSS and SSS). An amount of output power of those common channels is assured by activating all elements of the 2D antenna array in a 2D antenna array virtualization technique. In such embodiments, there are two aspects highlight the 2D antenna array virtualization in an FD-MIMO system operation. In one embodiment, an 2D antenna array virtualization is performed on any channel as needed that occupies a part or whole time-frequency resource to comprise mixed precoding symbols with other beamformed data channel. In another embodiment, a 2D antenna array virtualization operates in a flexible way by only driving single antenna, or using an amplitude taper scheme, or activating all antenna elements evenly.

In certain embodiments, an FD-MIMO system is used to overcome the challenge for a higher-order MU-MIMO and beamforming problems. In one embodiment, a channel quality indication (CQI) prediction is used to bridge a gap caused by different beam forming schemes such as a virtualized wide beam and a dedicated beam for each user. In another embodiment, a demodulation reference signal (DMRS) mapping provides a feasible operation to accommodate a higher-order MU-MIMO within the current standardized framework (such as 3GPP LTE). In yet another embodiment, per RB based precoder generation is used to counter a frequency selective channel reality in a wide band wireless communication system. The per RB based precoder generation balances a processing complexity and necessity to avoid a degeneration caused by a multipath fading effect.

In certain embodiments, a hardware calibration such as a full and partial (or separate) transmission and reception chains measurement is used to enhance performance of an FD-MIMO. Using calibration information, channel state information (CSI) in the air for each UE is precisely estimated, and, by using a reciprocity property of a TDD channel, beamforming precoders are applied to each UE's data traffic as well as a DMRS channel. The calibration information is also used to provide essential elements for antenna port virtualization precoders.

One or more of the components illustrated in FIG. 2 may be implemented in specialized circuitry configured to perform the noted functions, or one or more of the components may be implemented by one or more processors executing instructions to perform the noted functions.

Figure 3:
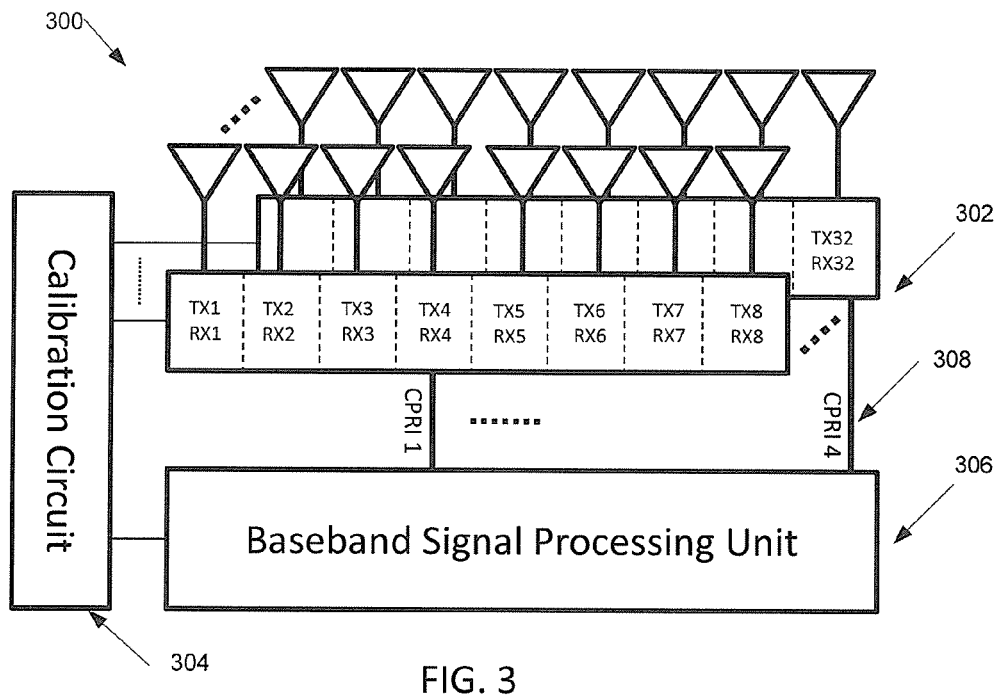
FIG. 3 illustrates an example hardware (HW) configuration of an FD-MIMO system according to an exemplary embodiment of the disclosure.

FIG. 3 illustrates an example hardware (HW) configuration 300 of an FD-MIMO system according to an exemplary embodiment of the disclosure. The embodiment of the HW configuration 300 shown in FIG. 3 is for illustration only. Other embodiments of the HW configuration 300 could be used without departing from the scope of this disclosure.

As illustrated in FIG. 3, the HW configuration 300 comprise a 2D antenna array 302 (such as 32 RF front-end), a dedicated calibration circuit 304, a baseband signal processing unit 306, and a plurality of common public radio interface (CPRI) 308. The baseband signal processing unit 306 includes RF units, a baseband analog circuit connected with a baseband processing unit through the CPRI 308.

As illustrated in FIG. 3 the 32 RF front-ends 302 are distributed on 4 physically independent boards that are connected to the baseband signal processing unit 306 through the 4 CPRI connections 308. The 4 CPRI connections introduce a sample level mismatching. Accordingly, a coarse alignment is designed to detect and compensate the sample level mismatching across multiple CRPI connections.

One or more of the components illustrated in FIG. 3 may be implemented in specialized circuitry configured to perform the noted functions, or one or more of the components may be implemented by one or more processors executing instructions to perform the noted functions.

Figure 4:
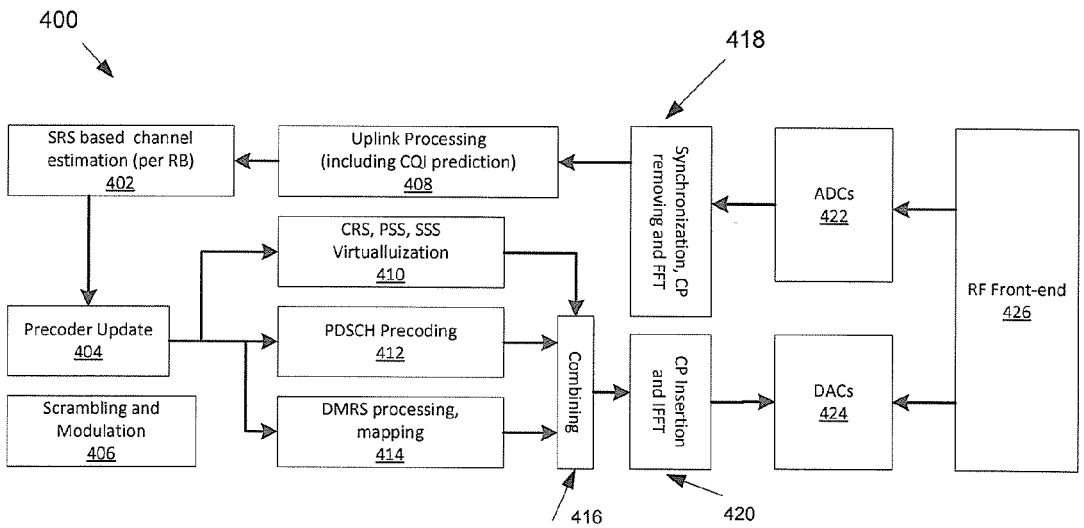
FIG. 4 illustrates an example unit diagram of an baseband processing for an FD-MIMO system according to an exemplary embodiment of the disclosure.

FIG. 4 illustrates an example unit diagram of an baseband processing 400 for an FD-MIMO system according to an exemplary embodiment of the disclosure. The embodiment of the base band processing system 400 shown in FIG. 4 is for illustration only. Other embodiments of the base band processing system 400 could be used without departing from the scope of this disclosure.

As illustrated in FIG. 4, the base band processing system 400 comprises a SRS based channel estimation (per RB) unit 402, a precoder update unit 404, a scrambling and modulation unit 406, an uplink processing unit 408 including a CQI processing, a virtualization unit 410 (such as CRS, CSRS, PSS, SSS), a physical downlink shared channel (PDSCH) precoding unit 412, a DMRS processing and mapping unit 414, a combining unit 416, a synchronization, a cyclic prefix (CP) removing and fast fourier transform (FFT) unit 418, a CP insertion and inverse FFT (IFFT) unit 420, an analog to digital converting (ADC) units 422, a digital to analog converting (DAV) unit 424, and an RF front-end unit 426. An estimated signal of the SRS based channel estimation unit 402 is delivered to the virtualization unit 410, the precoding unit 412, and the processing and mapping unit 414 through the precoder update unit 404. The combining unit 416 combines output signal from the virtualization unit 410, the precoding unit 412, and the processing and mapping unit 414. The combined signal of the combining unit 410 is delivered to the DACs unit 424 though the CP insertion and IFFT unit 420, and then transmitted to the RF front-end 426 to be transmitted to a receiver though the DACs unit 420. For a receiving operation, the RF front-end unit 426 delivers signals received from the transmitter to the synchronization, CP removing and FFT unit 418 through the ADCs unit 422. And then the output of the synchronization, CP removing and FFT unit 418 delivered to the SRS based channel estimation unit 402 through the uplink processing unit 408 including a CQI prediction.

One or more of the components illustrated in FIG. 4 may be implemented in specialized circuitry configured to perform the noted functions, or one or more of the components may be implemented by one or more processors executing instructions to perform the noted functions.

Figure 5:
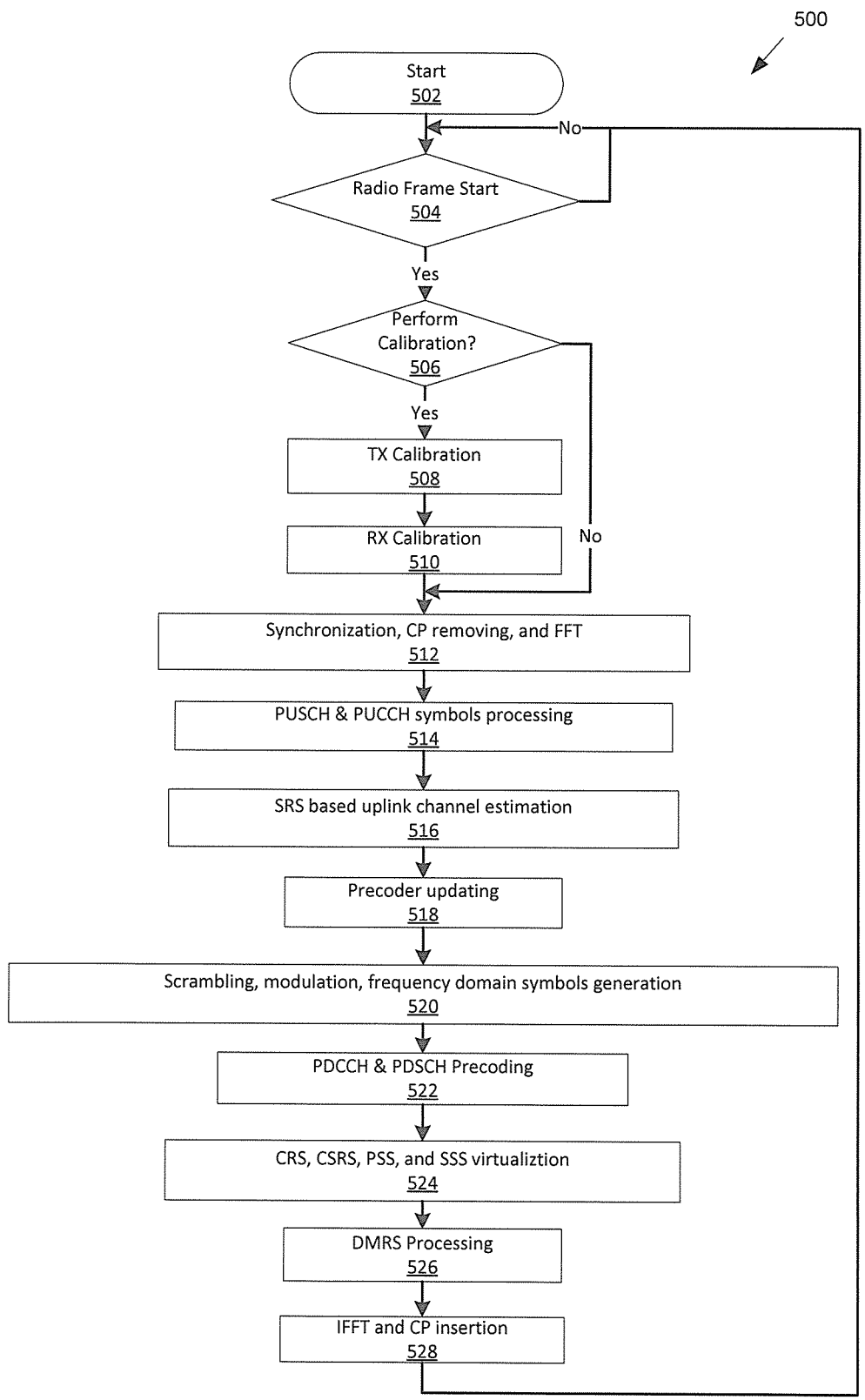
FIG. 5 illustrates an example flowchart of a basic processing method for an FD-MIMO system according to an exemplary embodiment of the disclosure.

FIG. 5 illustrates an example flowchart of a basic processing method 500 for an FD-MIMO system according to an exemplary embodiment of the disclosure. The embodiment of the FD-MIMO basic processing method 500 shown in FIG. 5 is for illustration only. Other embodiments of the basic processing method 500 for the FD-MIMO system could be used without departing from the scope of this disclosure.

As illustrated in FIG. 5, the basic processing method 500 begins at step 502. Subsequently, the method 500 proceeds to step 504, where a controller detects an instance of a radio frame. If the controller detects the radio frame, the method 500 proceeds to step 506. If not, the method proceeds to step 504. Subsequently, the method 500 proceeds to step 506, where the controller performs a calibration operation. If the calibration operation is skipped, the method 500 proceeds to step 512. If not, the controller proceeds to step 508, where the controller performs a transmit (Tx) calibration if the controller processes to transmit signals to the receiver. In contrast, the method 500 proceeds to step 510, where the controller performs receive (Rx) calibration if the controller processes to receive signals from the receiver. Subsequently, the method 500 proceeds to step 512, where the controller performs a synchronization, a CP removing, and an FFT processing for the signal. Subsequently, the method 500 proceeds to step 514, where the controller performs a physical uplink shared channel (PUSCH) and a physical uplink control channel (PUCCH) symbol processing if the controller receives signals from the receiver. Subsequently, the method 500 proceeds to step 516, where the controller performs an SRS based uplink channel estimation. Subsequently, the method 500 proceeds to step 518, where the controller performs updating a precoder based on the estimated information.

Subsequently, the method 500 proceeds to step 520, where the controller performs a scrambling, a modulation, and a frequency domain symbol generation. Subsequently, the method 500 proceeds to step 522, where the controller performs a precoding for a PDCCH and a PDSCH if the controller transmits signals to the receiver. Next, the method 500 proceeds to step 524, wherein the controller performs virtualization for a CRS, a CSRS, a PSS, and an SSS if the controller transmits signals to the receiver. Thereafter, the method 500 proceeds to step 526, where the controller performs a DMRS processing. Finally, the method 500 proceeds to step 528, where the controller performs an IFFT and a CP insertion.

One or more of the components illustrated in FIG. 5 may be implemented in specialized circuitry configured to perform the noted functions, or one or more of the components may be implemented by one or more processors executing instructions to perform the noted functions.

Table 1 and Table 2 show simulation assumptions and configurations. As shown in Table 1 and Table 2, different antenna array architectures with a baseline LTE eNB antenna array configuration is simulated.

TABLE 1

FD-MIMO: 8Hx4V Tx

| FD-MIMO Antenna configuration | Az. Spacing | El. Spacing | Az. Beamwidth/ Am | El. Beamwidth/ SLAv | Antenna Gain |
|---|---|---|---|---|---|
| #1 | 0.5 λ | 0.5 λ | $\phi_{3dB}$ = 65°, Am = 30 dB | $\theta_{3dB}$ = 65°, SLAv = 30 dB | 8 dBi |
| #2 | 0.5 λ | 2 λ | $\phi_{3dB}$ = 65°, Am = 30 dB | $\theta_{3dB}$ = 20°, SLAv = 30 dB | 12 dBi |

Baseline: 4Hx1V Tx

| eNB antenna configuration (HxV) | 4 × 1 (baseline) |
|---|---|
| Sub-array gain | 17 dBi |
| Azimuth beamwidth | 70-deg |
| Elevation beamwidth | 10-deg |
| Front-to-back radio | 25 dB |
| Electrical downtilt | 12-deg |

Simulation Setup:

3D ITU, UMa
57 sectors with K = 10/15 UEs per sector
Center frequency 2 GHz, bandwidth 10 MHz
UE speed 3 km/h
20% outdoor, 80% indoor UEs TABLE 1-continued UE: 2 Rx (H-V-pol)
BS: X-pol, down-tilt 12-deg

TABLE 2

| Antenna Array Type | | Throughput gain (over baseline 4TX) | |
|---|---|---|---|
| | | Cell avg. | Cell edge |
| Config. 1 (0.5 λ) | X-pol | 2.4x | 4.15x |
| | Alt.-pol | 3.3x | 5.5x |
| Config. 2 (2 λ) | X-pol | 3.5x | 5x |
| | Alt.-pol | 4x | 8.2x |

Table 1 and Table 2 show two different 4 FD-MIMO antenna array architectures, for example, two different antenna array configurations such as 0.5λ and 2λ antenna element spacing in elevation, respectively. As shown in Table 2, specific antenna parameters in conjunction with a 3D spatial channel model (SCM) obtain an average cell throughput gain of approximately 4 times and 8.2 times cell edge throughput gain compared with the LTE system.

Figure 6:
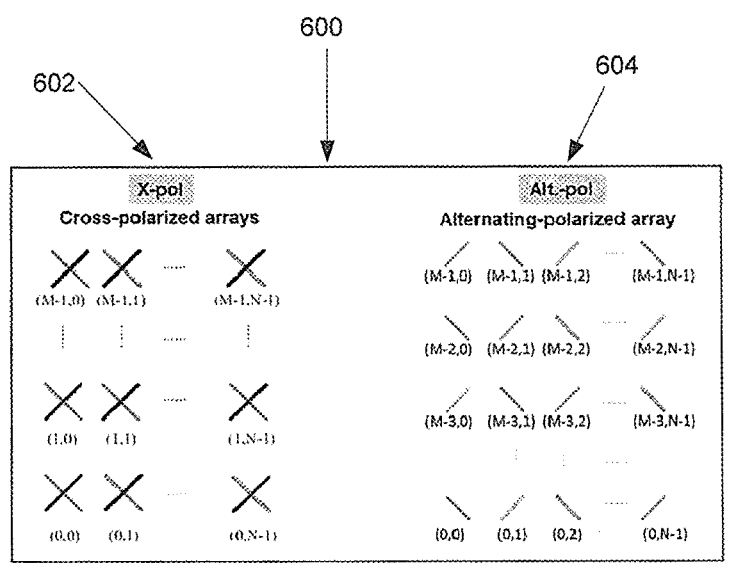
FIG. 6 illustrates an example configuration of a 4 FD-MIMO antenna array architecture according to an exemplary embodiment of the disclosure.

FIG. 6 illustrates an example configuration of a 4 FD-MIMO antenna array architecture 600 for a simulation according to an exemplary embodiment of the disclosure. The embodiment of the FD-MIMO antenna array architecture 600 shown in FIG. 6 is for illustration only. Other embodiments of the FD-MIMO antenna array architecture 600 could be used without departing from the scope of this disclosure.

As illustrated in FIG. 6, the 4 FD-MIMO antennas array configurations 600 for antenna polarization arrangements comprise a cross-polarized array 603 referred to as X-pol and an alternating polarized array 604 referred to as Alt-pol. A result of system level simulation shown in Table 2 is obtained using those two antennas array configurations illustrated in FIG. 6.

One or more of the components illustrated in FIG. 6 may be implemented in specialized circuitry configured to perform the noted functions, or one or more of the components may be implemented by one or more processors executing instructions to perform the noted functions.

Figure 7:
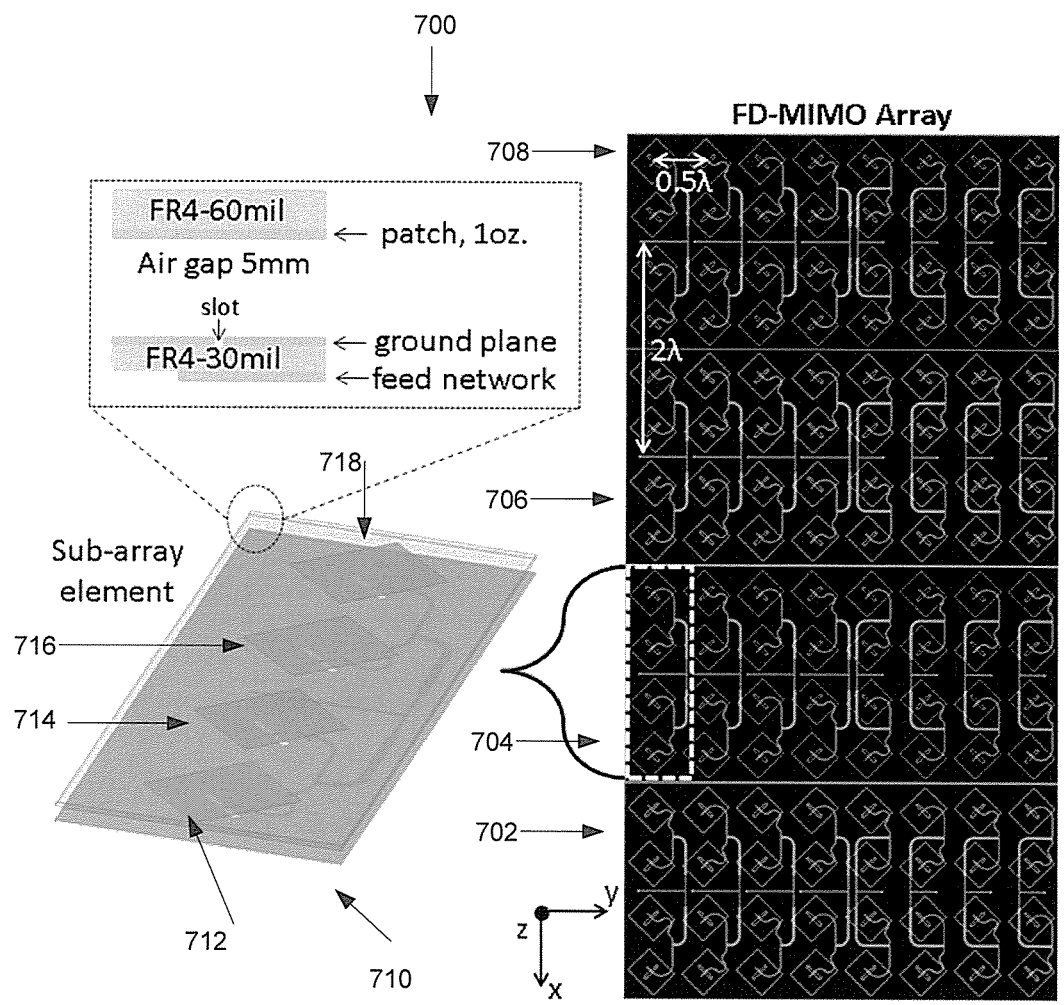
FIG. 7 illustrates an example configuration of an FD-MIMO 2 dimensional (D) antenna array according to an exemplary embodiment of the disclosure.

FIG. 7 illustrates an example configuration of an FD-MIMO 2 dimensional (D) antenna array 700 according to an exemplary embodiment of the disclosure. The embodiment of the FD-MIMO 2D antenna array 700 shown in FIG. 7 is for illustration only. Other embodiments of the FD-MIMO 2D antenna array 700 could be used without departing from the scope of this disclosure.

As illustrated in FIG. 7, the large scale FD-MIMO 2D antenna array 700 comprises 4 vertically arranged panels 702, 704, 706, 708, a sub-array 710, and a patch elements 712, 714, 716, 718. Each of the vertically arranged panels 702, 704, 706, 708 includes eight sub-arrays (such as sub-array 710) each of which is arranged in an 8H×1V configuration. Each of the sub-array 710 comprises the patch elements 712, 714, 716, 718 fed with a corporate feed network in a 1 horizontal (H)×4 vertical (V) configuration.

In certain embodiments, an FD-MIMO array includes ±45° rotated patch antenna elements that yield dual-linear polarization on two diagonal planes (such as φ=±45° as illustrated in FIG. 7). In such embodiments, the +45° and −45° sub-arrays have the same beam widths in an elevation)

(φ=0° domain and an azimuthal)(φ=90° domain. Specifically, the +45° and −45° sub-arrays are interlaced (such as orthogonally polarized) across each of vertically arranged panel (such as 4 vertically arranged panels 702, 704, 706, 708) in both array dimensions (such as H and V) to increase an isolation between adjacent sub-arrays (such as 710).

In certain embodiments, the patch elements 712, 714, 716, 718 of the sub-array 710 are fed through a corporate microstrip line feed network designed at a bottom layer of a ground plane. Therefore, energy is coupled to the each of patch elements 712, 714, 716, 718 through rectangular slot openings on the ground plane. In such embodiments, a feeding technique is provided for better bandwidth and higher isolation between the adjacent patch elements 712, 714, 716, 718, as compared to a direct probe feeding. An air gap between an antenna board and the ground plane is selected to maximize a bandwidth and a gain.

In such embodiments, performance of the measured sub-array is obtained with a polarization (such as dual-linear) ±45°, a bandwidth (such as 2.496-2.69 GHz), a beam width (such as 24°-64° for an elevation and azimuth), a gain (such as 10 dBi), and a return loss (such as >12 dB).

One or more of the components illustrated in FIG. 7 may be implemented in specialized circuitry configured to perform the noted functions, or one or more of the components may be implemented by one or more processors executing instructions to perform the noted functions.

Figure 8:
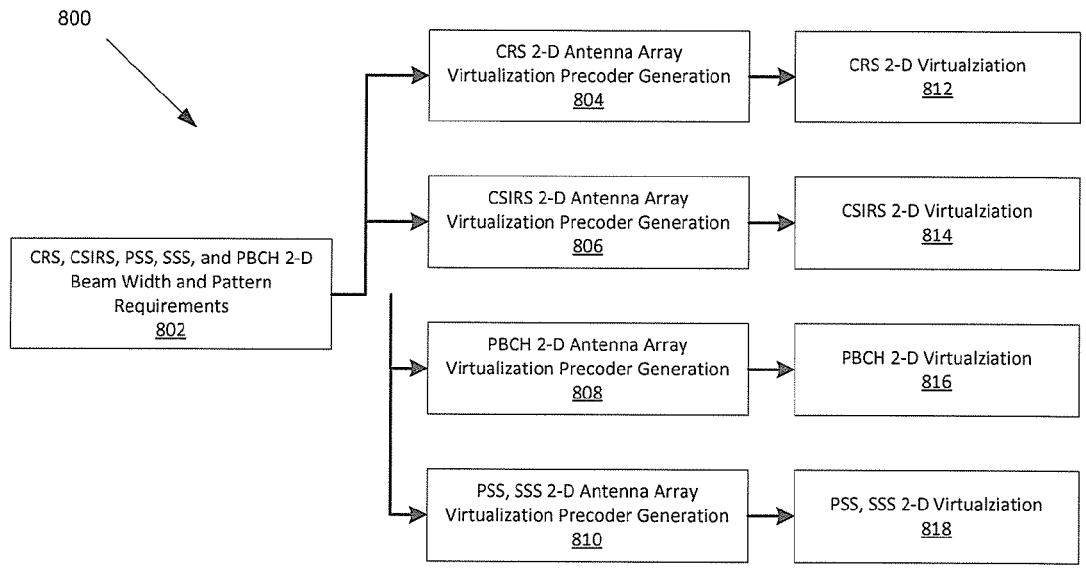
FIG. 8 illustrates an example unit diagram of an FD-MIMO antenna array visualization according to an exemplary embodiment of the disclosure.

FIG. 8 illustrates an example unit diagram of an FD-MIMO antenna array visualization 800 according to an exemplary embodiment of the disclosure. The embodiment of the FD-MIMO antenna array visualization 800 shown in FIG. 8 is for illustration only. Other embodiments of the FD-MIMO antenna array visualization 800 could be used without departing from the scope of this disclosure.

As illustrated in FIG. 8, the FD-MIMO antenna array virtualization 800 comprises a requirement unit 802, 2D antenna array virtualization precoder generations 804, 806, 808, 810, and 2D virtualization units 812, 814, 816, 818. The requirement unit 802 provides requirements to input channels (such as dedicated channels, CRS, CSIRS, PSS, SSS, and PBCH) each of which requires different requirements for virtualizations. Based on the requirements provided by the requirement unit 802, each of channels is processed by the antenna array virtualization precoder generation units 804, 806, 808, 810. For example, the CRS is processed by the CRS dedicated 2D antenna array virtualization precoder generation unit 804. Furthermore, each of channels that have been processed by the dedicated 2D antenna array virtualization precoder generation units 804, 806, 808, 810 is processed by the dedicated 2D virtualization units 812, 814, 816, 818. As similar with the 2D antenna array virtualization precoder generation units 804, 806, 808, 810, the 2D virtualization units 812, 814, 816, 818 are dedicated into the each of channels. For example, the CRS that has been processed by the 2D antenna array virtualization precoder generation unit 804 is processed by the 2D virtualization unit 812.

In certain embodiments, an antenna virtualization scheme integrates channels with different beam widths and patterns. In certain embodiments, virtualized channels are combined into symbols in order to generate a mixed beamforming pattern and/or an overlapped beamforming pattern in time domain. As aforementioned, an antenna virtualization in a wireless communications system is used to generate a radiation beam with an expected beam width and a pattern by transmitting a precoded data stream to an antenna array. In addition, the antenna virtualization requires 3-D beams. In certain embodiments, a virtualized beam is activated by only a single antenna, a part of antennas following some amplitude taper schemes, or all the antenna elements to provide power control gain at a system level.

One or more of the components illustrated in FIG. 8 may be implemented in specialized circuitry configured to perform the noted functions, or one or more of the components may be implemented by one or more processors executing instructions to perform the noted functions.

Figure 9:
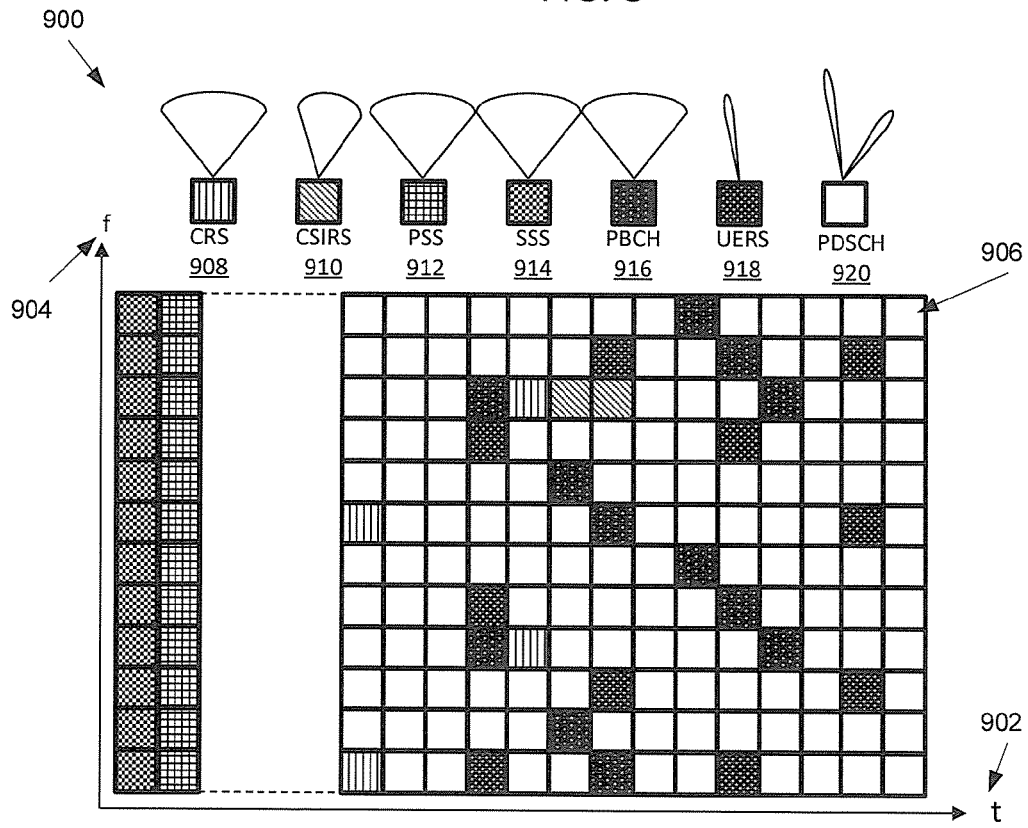
FIG. 9 illustrates an example configuration of an FD-MIMO antenna array visualization according to an exemplary embodiment of the disclosure.

FIG. 9 illustrates an example configuration of an FD-MIMO antenna array visualization 900 according to an exemplary embodiment of the disclosure. The embodiment of the FD-MIMO antenna array visualization 900 shown in FIG. 9 is for illustration only. Other embodiments of the FD-MIMO antenna array visualization 900 could be used without departing from the scope of this disclosure.

As illustrated in FIG. 9, the FD-MIMO antenna array virtualization 900 comprises a time domain 902, a frequency domain 904, a plurality of resource units 906, a CRS beam 908, a CSIRS beam 910, a PSS beam 912, a SSS beam 914, a PBCH beam 916, a UE specific reference signal (UERS) beam 918, and a PDSCH beam 920. As aforementioned, each of the channels (such as CRC, CSIRS, PSS, SSS, PBCH, UERS, and PDSCH) is transmitted on each of resource units 904 that is determined by the time domain 902 (such as time resources) and the frequency domain 904 (such as frequency resources). In addition, each of channels is processed by each of the antenna array virtualization precoder generation units 804, 806, 808, 810 and each of the virtualization units 812, 814, 816, 818, respectively. Each of the channels (such as CRC, CSIRS, PSS, SSS, PBCH, UERS, and PDSCH) is transmitted with each of beam patterns.

One or more of the components illustrated in FIG. 9 may be implemented in specialized circuitry configured to perform the noted functions, or one or more of the components may be implemented by one or more processors executing instructions to perform the noted functions.

Figure 10:
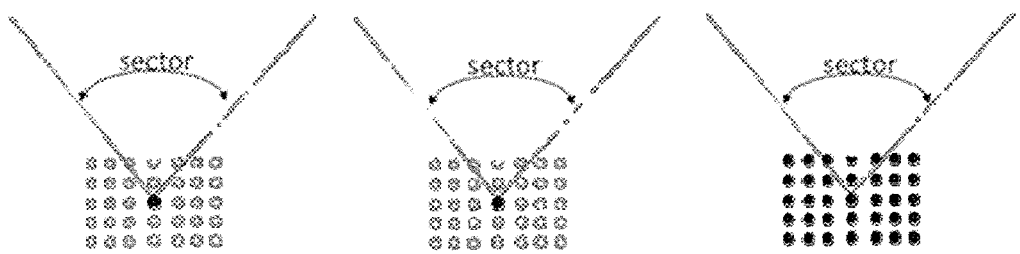
FIG. 10 illustrates an example configuration of an FD-MIMO beam forming in a 2D large scale antenna array according to an exemplary embodiment of the disclosure.
Figure 10:

FIG. 10 illustrates an example configuration of an FD-MIMO beam forming in a 2D large scale antenna array 1000 according to an exemplary embodiment of the disclosure. The embodiment of beam forming in a 2D large scale antenna array 1000 shown in FIG. 10 is for illustration only. Other embodiments of the FD-MIMO beam forming in a 2D large scale antenna array 1000 could be used without departing from the scope of this disclosure.

As illustrated in FIG. 10, the FD-MIMO beam forming in a 2D large scale antenna array 1000 comprises an excite only one element beam forming 1005, an excite few elements beam forming with an amplitude taper 1010, and an excite all elements beam forming with a phase shaper 1015. Specifically, the excite few elements beam forming with an amplitude taper 1010 includes an aggressive amplitude taper and the excite all elements beam forming with a phase shaper 1015 includes a very right amplitude taper and different phases.

In certain embodiments, a beam is transmitted from one antenna array elements to generate a wide beam that covers a specific sector angle using a 2D active antenna array. However, the beam is transmitted with very little power because only one element (such as out of typically a few decades of elements) is excited. Thus a beam range is limited and a maximum power rating for transmission per element is consumed.

In certain embodiments, a beam is transmitted from a few antenna elements (such as 1005 and 1010) each of which includes a certain amplitude weight (such as pattern synthesis). As noted, FIG. 10 shows a 1-D beam covering a planar sector (such as azimuth), and the beam is visualized as 2D beam covering a sector with specific elevation and azimuth dimensions. In such embodiments, a pattern synthesis scheme for control of side lobes and control of precise beam widths result in an amplitude tapers that heavily excite a few antenna elements at the center of the antenna array while the majority of the elements is left unexcited. Accordingly, power is lost and a beam range is limited while consuming a maximum power rating at each antenna element.

In certain embodiments, large scale 2D FD-MIMO antenna arrays provide many active antenna elements and reduce a maximum power rating per element, but still needs to maintain a higher total transmitted power. In such embodiments, generating a 2D beam with specific beam widths in an elevation and azimuth is not trivial. Furthermore, when only a few elements within a large antenna array are excited to create a specific side beam, the wear and tear these elements experience as compared to the rest of the antenna elements is significant, leading to reliability issues and potential hardware failure in the long run.

In certain embodiments, all antenna elements are uniformly excited in an amplitude (or at least with a very small taper) with a different phase profile (such as phase taper) so as to create a wide beam and control side lobe levels. In such embodiments, generating a wide beam with all antenna elements excited at full power is not a trivial task since, in general, a fully excited antenna array generates a focused narrow beam width pattern (as illustrated in FIG. 11 and FIG. 3).

One or more of the components illustrated in FIG. 10 may be implemented in specialized circuitry configured to perform the noted functions, or one or more of the components may be implemented by one or more processors executing instructions to perform the noted functions.

Figure 11:
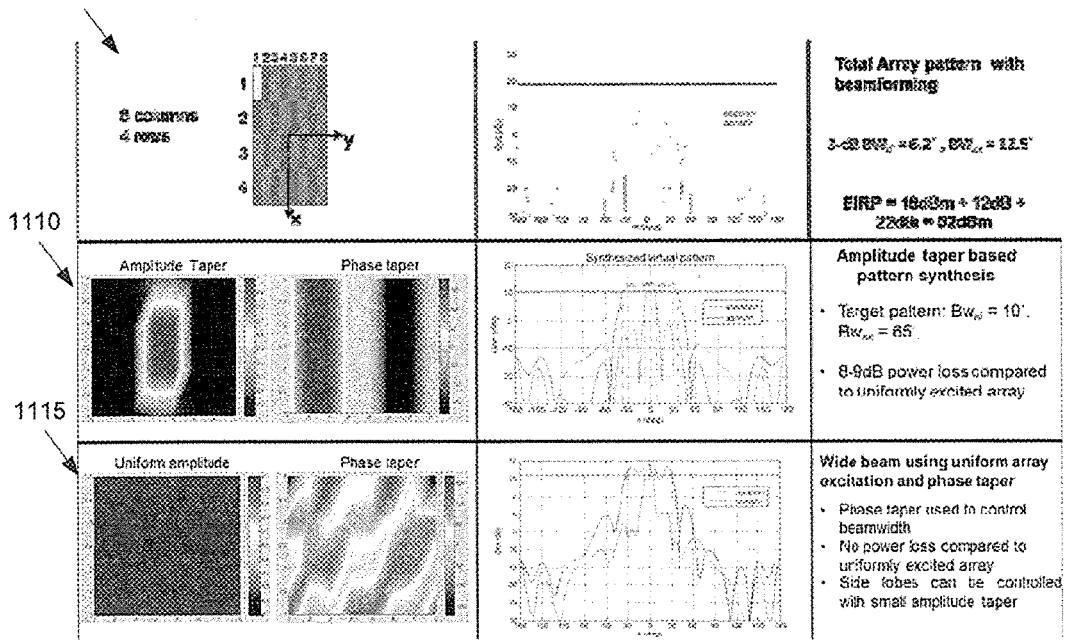
FIG. 11 illustrates an example performance result of an FD-MIMO 2D antenna array according to an exemplary embodiment of the disclosure.

FIG. 11 illustrates an example performance result of an FD-MIMO 2D antenna array 1100 according to an exemplary embodiment of the disclosure. The embodiment of the performance results of an FD-MIMO 2D antenna array 1100 shown in FIG. 11 is for illustration only. Other embodiments of the simulation results of an FD-MIMO 2D antenna array 1100 could be used without departing from the scope of this disclosure.

As illustrated in FIG. 11, the performance results 1100 comprises performance results of a 2D FD-MIMO antenna array with a beamformed gain pattern 1105, performance results of an amplitude taper based pattern synthesis 1100, and performance results of a wide beam pattern using uniform array excitation and phase taper 1115 (such as all antenna array elements excited with equal amplitudes but different phases). Specifically, the performance results of an amplitude taper based pattern synthesis 1100 synthesizes a wide beam pattern with specific beam widths in elevation and azimuth using an aggressive amplitude taper, where the majority of antenna array elements are almost un-excited. In certain embodiments, the FD-MIMO illustrated in FIG. 3 is implemented with an amplitude taper scheme to generate a wide beam pattern illustrated in FIG. 11 (such as 1110).

As illustrated in FIG. 11, the pattern synthesis 1100 based on the amplitude taper results in heavy power loss compared to a uniformly excited array (such as 1115). Accordingly, in order to generate a wide beam with certain beam widths in azimuth and elevation and all antenna elements that are equally excited (or almost equally), a certain phase taper is applied. In addition, the certain phase taper has a robustness to account for possible phase errors in a phase calibration process.

As aforementioned, because a desired 2D beam pattern is generated with a total transmitted power that is equal to a maximum transmitted power, a beam range is maximized. As illustrated in FIG. 11 (such as 1115), a 3 dB beam width covers a sector of about 65 deg. in azimuth and 10 deg. in elevation.

One or more of the components illustrated in FIG. 11 may be implemented in specialized circuitry configured to perform the noted functions, or one or more of the components may be implemented by one or more processors executing instructions to perform the noted functions.

Figure 12:
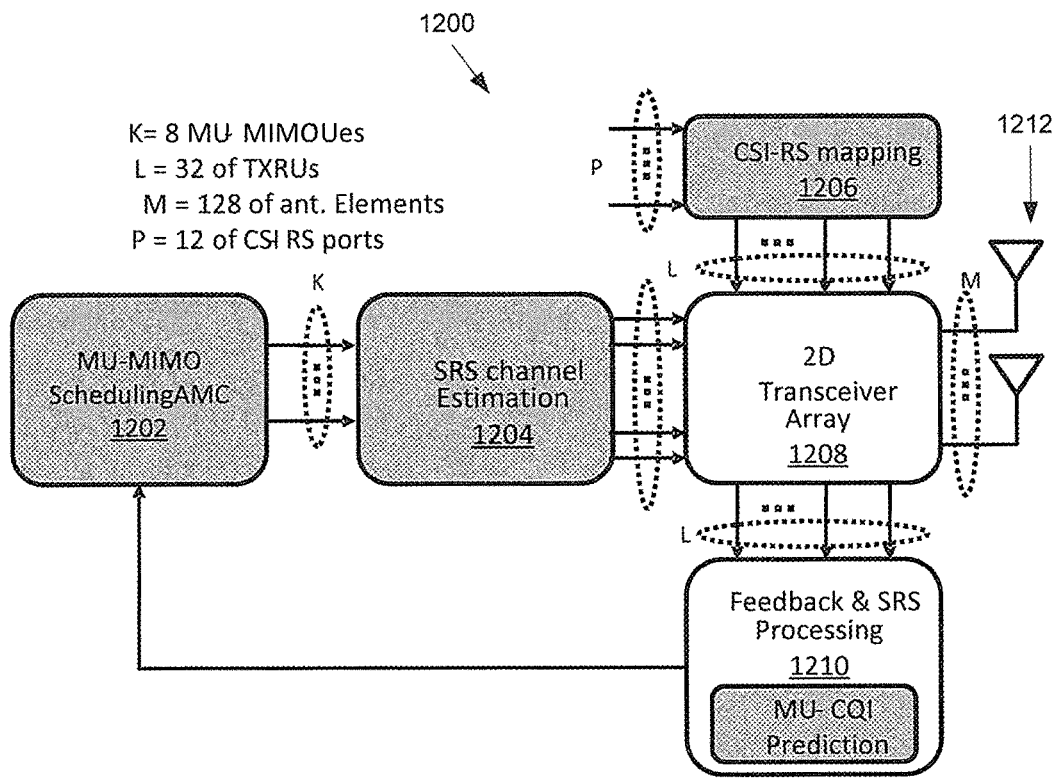
FIG. 12 illustrates an example unit diagram of an eNodeB (eNB) processing chain with a multi-user channel quality indication (MU-CQI) prediction according to an exemplary embodiment of the disclosure.

FIG. 12 illustrates an example unit diagram of an eNodeB (eNB) processing chain with a multi-user channel quality indication (MU-CQI) prediction 1200 according to an exemplary embodiment of the disclosure. The embodiment of eNB processing chain with the MU-CQI prediction 1200 shown in FIG. 12 is for illustration only. Other embodiments of eNB processing chain with the MU-CQI prediction 1200 could be used without departing from the scope of this disclosure.

As illustrated in FIG. 12, the eNB processing chain with the MU-CQI prediction 1200 comprises an MU-MIMO scheduling and adaptive modulation coding (AMC) unit 1202, an MU-MIMO precoding unit 1204, a channel status information-reference signal (CSI-RS) mapping unit 1206, a 2D transceiver unit 1208, a feedback and SRS precoding unit 1210, and a plurality of antennas 1212. Output signals from the MU-MIMO scheduling and AMC unit 1202 are delivered to the MU-MIMO precoding unit 1204, where a number of signals to be transmitted to the MU-MIMO precoding unit 1202 are determined by a number of MU-MIMO UEs communicating with the eNB. For example, 8 MU-MIMO UEs are being served in a wireless communication network, a total of 8 output signals from the MU-MIMO scheduling AMC unit 1202 are transmitted to the MU-MIMO precoding unit 1204. Signals from the MU-MIMO precoding unit 1204 are transmitted to the 2D transceiver array unit 1208 through a plurality of transmit resource units (TxRUs). In this example, a total of 32 TxRUs are connected to the 2D transceiver array 1208.

The CSI-RS mapping unit 1206 transmits input signals through CSI-RS ports to the 2D transceiver array unit 1208, where a number of CSI-RS ports are determined by a number of CSI-RS. In this example, a total of 12 CSI-RS ports are determined. In addition, the feedback and SRS processing unit 1210 transmits signals to the 2D transceiver array unit 1208 while providing feedback information to the MU-MIMO scheduling and AMC unit 1202. Specifically, the feedback and SRS processing unit 1210 performs an MU-CQI predication. Finally, the 2D transceiver array unit 1208 combine and process all of signals from the CSI-RS mapping unit 1206, the MU-MIMO precoding unit 1204, and the feedback and SRS processing unit 1210, and then transmit signals to the plurality of MU-MIMO UEs through the plurality of antennas 1212. In this example, a total of 128 antenna elements are determined.

In certain embodiments, a special precoder (such as antenna virtualization) is used for control symbols to ensure a wide coverage. For example, $w_0 = [w_1, \ldots, w_{Nt}]$ is defined as the antenna virtualization precoder, a control symbol $s_0^j$ is determined in accordance with equation (1)

$$x_0^j = w_0 s_0^j \qquad (1)$$

In an FD-MIMO, an antenna array is 2 Dimensional and has many active antenna elements. Therefore, it is non-trivial to design $w_0$ to maintain a similar wide-beam pattern as a conventional MIMO system.

A CQI is a feedback parameter from UEs that informs an eNB an overall signal-to-noise ratio (SNR) at the UEs, and considerably impacts a transmission scheme, a modulation and coding scheme selected by the eNB. In one example of LTE/LTE-A, a UE usually derives a CQI based on symbols transmitted by an antenna virtualization. In contrast, data symbols are usually precoded by beams with a narrow width to reduce interference for unintended UEs. Therefore, CQI does not match with the SNR of the data channel due to the precoding difference. In an FD-MIMO system, such mismatch is significant since a precoding for data symbols has much narrower beam widths due to a large number of antennas. Therefore, the eNB needs to estimate SNR for data channels based on the feedback CQI (such as CQI prediction).

One or more of the components illustrated in FIG. 12 may be implemented in specialized circuitry configured to perform the noted functions, or one or more of the components may be implemented by one or more processors executing instructions to perform the noted functions.

Figure 13:
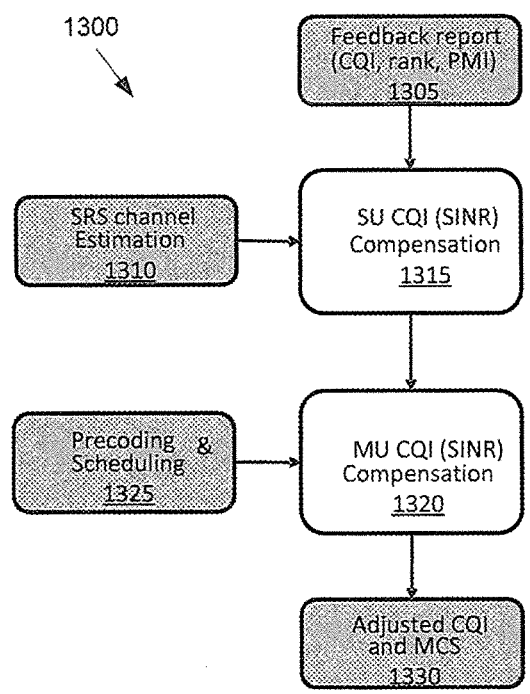
FIG. 13 illustrates an example unit diagram of a multi-user channel quality indication (MU-CQI) prediction according to an exemplary embodiment of the disclosure.

FIG. 13 illustrates an example unit diagram of a multi-user channel quality indication (MU-CQI) prediction 1300 according to an exemplary embodiment of the disclosure. The embodiment of the MU-CQI prediction 1300 shown in FIG. 13 is for illustration only. Other embodiments of the MU-CQI prediction 1300 could be used without departing from the scope of this disclosure.

As illustrated in FIG. 13, the MU-CQI prediction 1300 comprises a feedback report unit 1305, an estimation channel estimation unit 1310, a single user CQI (such as signal to interference noise ratio (SINR)) compensation unit 1315, an MU-CQI (SINR) compensation unit 1320, a precoding and scheduling unit 1325, and an adjusted CQI and MCS unit 1330. A feedback single (such as CQI, rank, precoding matrix index (PMI)) and an SRS channel estimated signal are delivered from the feedback report unit 1305 and the SRS channel estimation unit 1310, respectively, to the SU CQI compensation unit 1315. The SU CQI compensation unit 1315 accounts for a difference between the SINR for SU CQI, and the estimated SRS channel and the feedback report, and then compensates the SU CQI. Similarly, an output signal of the SU CQI compensation unit 1315 and an output signal of the precoding and scheduling unit 1325 are accounted for the MU CQI at the MU-CQI compensation unit 1320. And then, an output signal (such as compensated MU-CQI signal) of the MU-CQI compensation unit 1320 is adjusted to an actual CQI with an MCS level at the adjusted and MCS unit 1330.

In certain embodiments, an SINR (or Tx CQI) prediction is performed for an SU-MIMO UE with a 1-Tx antenna. In such embodiments, a predicting SINR scheme assumes no intra-cell interference. An eNB knows virtualization weights applied in downlink common control channels as well as each of channels of individual antennas based on an uplink SRS measurement. Therefore, the eNB reconstructs the downlink channels for common control channels (such as cell-specific reference signal (CRS)) where antenna virtualization is applied. In addition, the eNB accounts for a difference between an SINR of CRS and an actual data channel, and compensates a CQI. Received downlink signals ($y_k$) with the antenna virtualization ($w_0$) at a UE k (assuming such as a single Tx antenna UE) is represented in accordance with equation (2):

$$y_k = h_k w_0 s_0 + n_k, \quad k=1,\ldots,K, \quad (2)$$

where $h_k$ is the channel direction vector for the UE k, that is estimated at the eNB utilizing SRS transmitted by the UE's 1-Tx antenna, $s_0$ is a transmission symbol, and $n_k$ is noise at the UE receiver.

For simplicity, it is assumed that feedback CQI, $\rho_{0k}$, fed back by the UE k is equal to the corresponding SINR estimated at the UE in accordance with equation (3):

$$\rho_{0k} = \frac{|h_k w_0|^2}{\sigma_k^2} \quad (3)$$

where $\sigma_k^2$ is the receiver noise variance that is unknown to the eNB.

When a UE-specific precoder $w_k$ is applied, the downlink Tx SINR $\rho_k$ for data symbols is calculated in accordance with equation (4):

$$\rho_k = \frac{|h_k w_k|^2}{\sigma_k^2} \quad (4)$$

As the eNB is aware of the channel direction vector $h_k$ via SRS channel estimates, the SINR is obtained for data channels (or Tx CQI) in accordance with equation (5):

$$\rho_k = \frac{|h_k w_k|^2}{|h_k w_0|^2} \rho_{0k} \quad (5)$$

where $\rho_{0k}$ is a feedback CQI, $w_0$ is an antenna virtualization precoder, and $W_k$ is the UE-specific precoder $W_k$.

Figure 14:
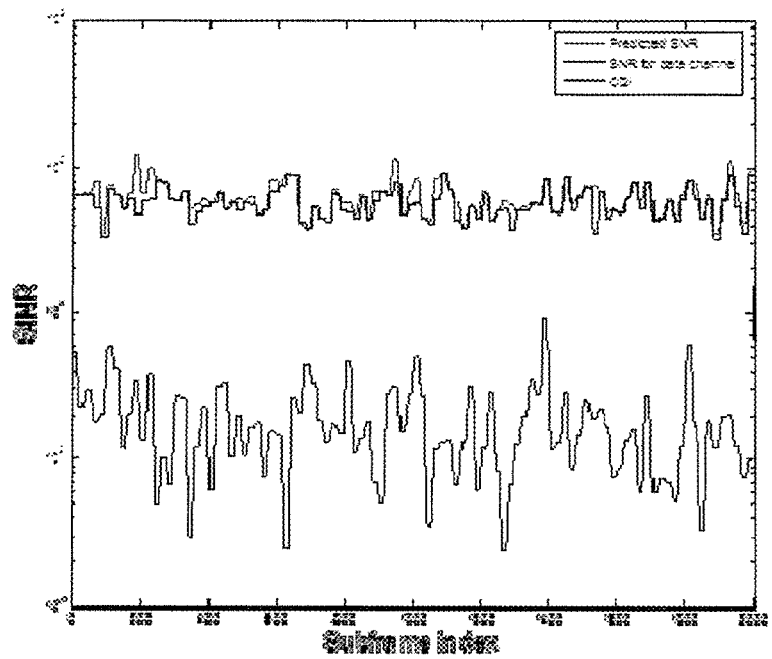
FIG. 14 illustrates an example simulation result of a single user CQI (SU-CQI) according to an exemplary embodiment of the disclosure.

Once Tx CQI is obtained, the Tx CQI is used for a link adaptation (such as for determining MCS for the UE). FIG. 14 shows the simulation results of the prediction scheme achieving 10% normalized prediction error according to an exemplary embodiment of the disclosure.

In certain embodiments, a Tx-CQI prediction for an MU-MIMO is performed for a 1-antenna UE with a 1 CQI and a 1 SRS. When MU-MIMO operation exists, an eNB needs to not only compensate for an SINR mismatching between a CRS (common control signal) and a UE-RS (data signal) but also accounts for an MU interference. In such embodiments, 3 types of MU SINR compensation schemes are considered as shown in Table 3.

TABLE 3

| Alternatives | Complexity | Performance | Remark |
| --- | --- | --- | --- |
| Power-reduced SU SINR | Little power normalization needed | Low | No MU interference captured; over-estimated SINR with large mismatch |
| MRC MU SINR | Medium calc. inner product | Medium | MU interference captured; Under-estimated SINR as Rx is MMSE IRC |
| MMSE MU SINR | High matrix inversion needed | High | MU interference captured; Well matched SINR |

In the power-reduced SU SINR scheme as shown in Table 3, the predicted SU SINR is divided by a number of MU-MIMO UEs that are co-scheduled. This scheme is simple and accounts for the fact that the power is equally shared among different MU-MIMO UEs. Accordingly, the SINR is reduced proportionally.

In the maximum-ratio combining receiver (MRC) MU SINR scheme as when in Table 3, an eNB assumes that the MRC is used at UEs. Because the eNB knows a data precoding and channels for different UEs, and therefore, the eNB estimates MU interference. More specifically, the eNB follows three steps to calculate the MU SINR. At step 1, the eNB maps CQI into an SINR $\rho_0$ based on a certain mapping rule. At step 2, the eNB obtains channel estimates based on one SRS, denoted by $\mu_1 h_1$, where $h_1$ (for 1 transmit antenna and $N_r$ receive antennas) is the $1 \times N_r$ normalized channel direction vector and $\mu_1$ is the power associated with this channel for UE 1. Due to a CQI mismatching, a downlink channel SNR (such as power) is different than an uplink SNR estimated with SRS. At step 3, the eNB reconstructs (such as re-calculate) the SINR or an MU-CQI based on an SRS channel estimation. In this example, the MU SINR (such as a number of co-scheduled MU UEs (L) at the Rx of UE 1) is predicted in accordance with equation (6):

$$SINR_{l,MU} = \frac{P|h_l w_l|^2}{L\sigma_l^2 + \sum_{i \neq l} |h_l w_i|^2} \quad (6)$$

where P denotes the total transmitted power at the eNB, $\sigma_l^2$ denotes noise power at the UE 1, and $w_l$ is the precoding vector for the l-th UE.

It is assumed that the UE computes its SINR (CQI) under a hypothesis that an eNB employs a conjugate beamforming with the total transmitted power P (such as the precoding vector of UE 1 is equal to $h_l^H$, where H denotes Hermitian operation). The SINR computed by the UE is termed as a single user SINR (or feedback CQI) and given by equation (7):

$$SINR_{l,SU} = \frac{P\|h_l\|^2}{\sigma_l^2} \quad (7)$$

For conjugate beamforming, the MU-SINR (such as Tx CQI) is computed in accordance with equation (8):

$$SINR_{l,MU} = \frac{SINR_{l,SU}}{SINR_{l,SU} \sum_{i \in M-l} \rho_{li}^2 + L} \quad (8)$$

where the correlation coefficient $\rho_{li}$ is defined as $$\rho_{li} = \left| < \frac{h_l}{\|h_l\|}, \frac{h_i}{\|h_i\|} > \right|.$$

Once L Tx CQI's are obtained for the L MU-MIMO UEs, the Tx CQI is used for a link adaptation (such as for determining MCS for each UE participating in the MU-MIMO transmission). In order to support up to 4 UE MU-MIMO operations, a mapping between a UE and an antenna port is required.

In certain embodiments, a scrambling ID (SCID) is combined with a DMRS port to support 4-UE MU-MIMO. An exemplary mapping is given in Table 4.

TABLE 4

| UE # | Port Assignment | SCID |
|---|---|---|
| UE1 | DMRS Port 7 | 0 |
| UE2 | DMRS Port 8 | 0 |
| UE3 | DMRS Port 7 | 1 |
| UE4 | DMRS Port 8 | 1 |

In order to support up to 8-UE MU-MIMO operations, 8 layers are mapped with 8 UEs each of which includes 1 layer transmission. An exemplary mapping is given in Table 5.

TABLE 5

| UE # | Port Assignment | SCID |
|---|---|---|
| UE1 | DMRS Port 7 | 0 |
| UE2 | DMRS Port 8 | 0 |
| UE3 | DMRS Port 9 | 0 |
| UE4 | DMRS Port 10 | 0 |
| UE5 | DMRS Port 11 | 0 |
| UE6 | DMRS Port 12 | 0 |
| UE7 | DMRS Port 13 | 0 |
| UE8 | DMRS Port 14 | 0 |

In general, the power-reduced SU SINR scheme and the maximum-ratio combining receive MU SINR scheme as shown in Table 3 are combined to increase a number of supportable UEs. For instance, with both SCID=0 and 1, the mapping in Table 5 is extended to support up to 16 UEs. This allows a more efficient DMRS resource allocation and, at the same time, an increased DMRS capacity.

In certain embodiments, a precoder is generated with a processing of an output of channel estimation in an FD-MIMO system. Accordingly, a simple conjugate beamforming or more advanced scheme are performed appropriately.

Figure 15:
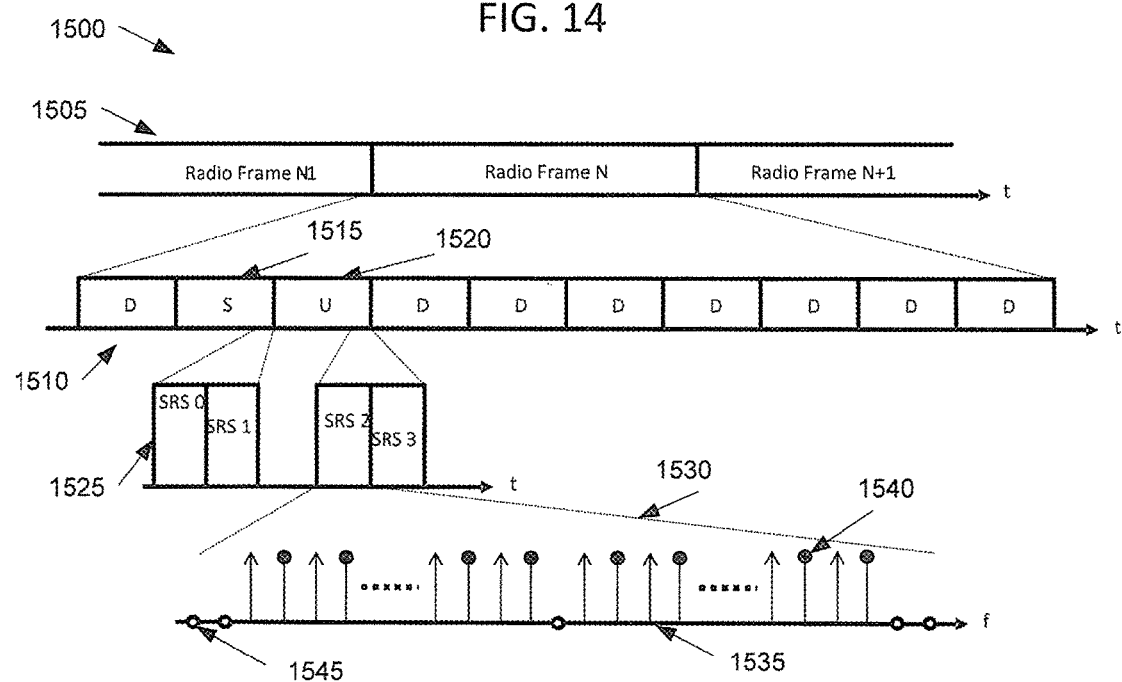
FIG. 15 illustrates an example configuration of a sounding reference signal (SRS) channel assignment according to an exemplary embodiment of the disclosure.

FIG. 15 illustrates an example configuration of a sounding reference signal (SRS) channel assignment 1500 for an uplink channel arrangement to support a high-order MU-MIMO in an FD-MIMO system according to an exemplary embodiment of the disclosure. The embodiment of the SRS channel assignment 1500 shown in FIG. 15 is for illustration only. Other embodiments of the SRS channel assignment 1500 could be used without departing from the scope of this disclosure.

As illustrated in FIG. 15, the SRS channel assignment 1500 comprises a plurality of radio frames 1505, a plurality of downlink sub-frames (D) 1510, a special sub-frame (S) 1515, and an uplink sub-frame (U) 1520. Each of radio frames 1505 includes the plurality of downlink sub-frames 1510, the special sub-frames 1515, and the uplink sub-frames 1520. More specifically, the special sub-frame (S) 1515 and the uplink sub-frame 1520 (U) include a plurality of symbols 1525 (such as four symbols) for an uplink SRS channel.

The four symbols 1525 are denoted as SRS 0, SRS 1, SRS 2, and SRS 3. Each symbol is designed to accommodate two SRS channels in the shared channel 1515 and the uplink channel 1520, respectively, for one UE. The two SRS channels are interleaved to form a wideband channel for a channel estimation operation at an eNB side. As illustrated in FIG. 15, a plurality of sub-carriers 1530 that are allocated to the plurality of SRS channels 1525 are marked with a plurality of arrow end sub-carriers 1535, a plurality of dot end sub-carriers 1540, and a plurality of circle end sub-carriers 1545. The plurality of the arrow end sub-carriers 1535 comprises one SRS channel for one UE. In contrast, the plurality of the dot end sub-carriers 1540 comprises another SRS channel for one UE. The plurality of the null sub-carriers 1545 marked with circle is a direct current (DC) (such as upper and lower side band).

As illustrated in FIG. 15, the last two symbols (such as SRS 0 and SRS1) in the special sub-frame 1515 and the last two symbols (such as SRS 2 and SRS 3) in the uplink sub-frame 1520 are designed to allocate an uplink SRS channel. Every other subcarrier are allocated to one UE if the subcarriers are separated by odd and even number subcarriers. Accordingly, the odd and even number subcarriers are assigned to two UEs SRS signal. As a result, a total of eight UEs are supported in the FD-MIMO system operations.

One or more of the components illustrated in FIG. 15 may be implemented in specialized circuitry configured to perform the noted functions, or one or more of the components may be implemented by one or more processors executing instructions to perform the noted functions.

Figure 16:
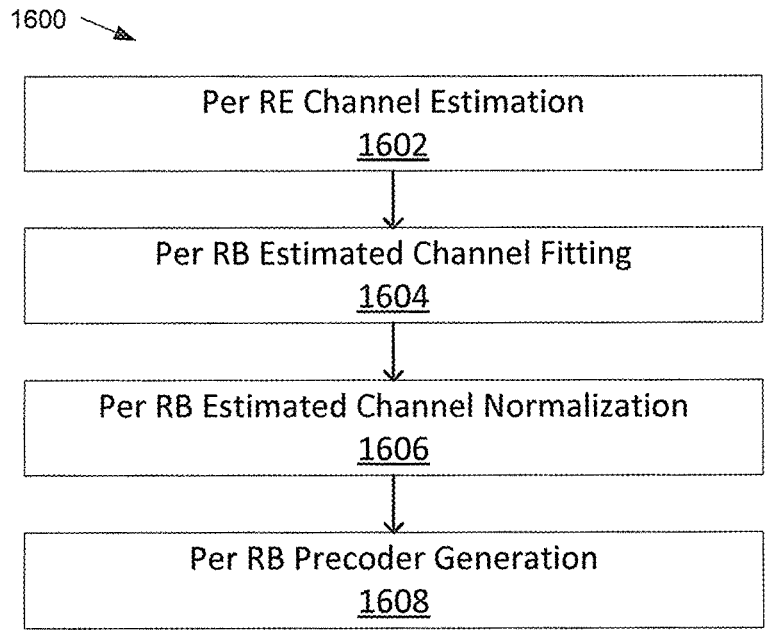
FIG. 16 illustrates an example flowchart of an SRS based channel estimation and per resource unit (RB) precoder generation method according to an exemplary embodiment of the disclosure.

FIG. 16 illustrates an example flowchart of an SRS based channel estimation and per resource unit (RB) precoder generation method 1600 according to an exemplary embodiment of the disclosure. The embodiment of the SRS based channel estimation and per RB precoder generation method 1600 in FIG. 16 is for illustration only. Other embodiments of the SRS based channel estimation and per RB precoder generation method 1600 could be used without departing from the scope of this disclosure.

As illustrated in FIG. 16, the method 1600 begins at step 1602, where the method 1600 estimates a channel per RB. Next the method 1600 proceeds to step 1604, where the method performs fitting operation for the per RB estimated channel. Therefore, per RB estimated channel fitting presents channel information in every RB to trade off implementation complexity and processing accuracy. Subsequently, the method proceeds to step 1606, where the method normalizes the per RB estimated channel. Finally, the method proceeds to step 1608, where the method generates per RB precoder. As illustrated in FIG. 16, the method 1600 performs uplink channel estimation and precoder generation on each sub-carrier based on SRS.

In certain embodiments, the normalization at step 1606 illustrated in FIG. 16 is performed on a channel status vector on each RB. Accordingly, the normalization based on the channel status vector of the $k^{th}$ UE on the $l^{th}$ RB as $w_{kl}$ is obtained in accordance with equation (9)

$$w_{kl} = \frac{w_{kl}}{\|w_{kl}\|} \quad (9)$$

One or more of the components illustrated in FIG. 16 may be implemented in specialized circuitry configured to perform the noted functions, or one or more of the components may be implemented by one or more processors executing instructions to perform the noted functions.

Figure 17:
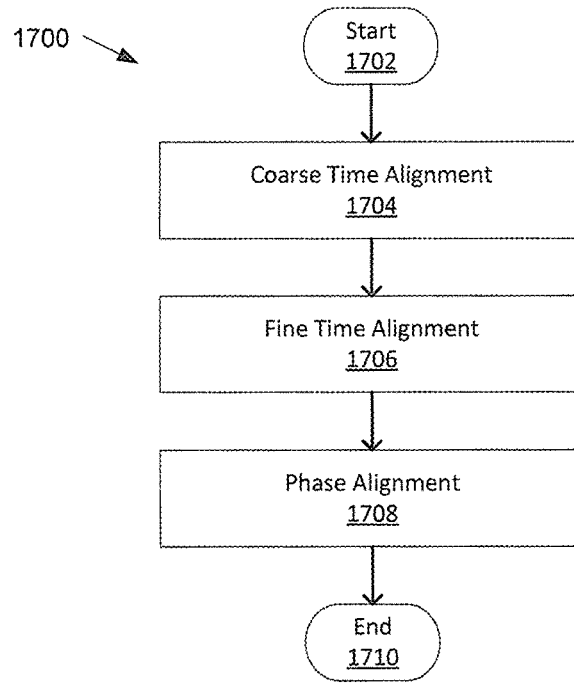
FIG. 17 illustrates an example flowchart of a calibration method according to an exemplary embodiment of the disclosure.

FIG. 17 illustrates an example flowchart of a calibration method 1700 for a Tx and an Rx according to an exemplary embodiment of the disclosure. The embodiment of the calibration method 1700 shown in FIG. 17 is for illustration only. Other embodiments of the calibration method 1700 could be used without departing from the scope of this disclosure.

As illustrated in FIG. 3 (such as system level architecture), 32 RF front-ends are distributed on 4 physically independent boards each of which is connected to the baseband signal processing unit 306 through the 4 CPRI connections 308. Each RF board (such as 32 RF boards) is equipped with a common Tx and Rx channel. Accordingly, a calibration function is achieved across the eights Tx and Rx channels in a single board.

In certain embodiments, an auxiliary switch network is designed on each RF board to calibrate the channels on multiple RF boards. The auxiliary switch network is firstly connected to the common channels that transmits and receives signals. In addition, the auxiliary switch network accomplishes a calibration function for all 32 channels (such as 32 RFUs).

As illustrated in FIG. 17, the method begins at step 1702. Subsequently, the method 1700 proceeds to step 1704, where the method performs a coarse time alignment to detect and compensate a sample level mismatching across multiple CRPI connections (such as 308 illustrated in FIG. 3). As illustrated in FIG. 3 the 32 RF front-end 302 are distributed on 4 physically independent boards that are connected to the baseband signal processing unit 306 through the 4 CPRI connections 308. The 4 CPRI connections introduce the sample level mismatching. Next, the method 1700 proceeds to step 1706, where the method performs a fine time alignment to detect and compensate a delay differences across multiple channels to less than one nanosecond. Subsequently, the method 1700 proceeds to step 1708, where the method 1700 performs a phase alignment to tune a phase of multiple channels into an in-phase. Finally, the method 1700 ends at step 1710.

In certain embodiments, an RF front-end calibration measures a gain, a timing, and a phase difference across multiple Rx channels as well as multiple Tx channels. In such embodiments, a precoder generation (such as 1608 as illustrated in FIG. 16) needs the calibration information to compensate an impact of an RF chain. Moreover, the RF front-end calibrations make the antenna port virtualization feasible in an FD-MIMO system.

In certain embodiments, filters in an RF front-end introduce a group delay from a few nanoseconds to more than ten nanoseconds. Because an FD-MIMO system is a broad band wireless communications with at least 10 MHz band, a few nanoseconds group delay is not negligible and compensated by only one phase. The fine time alignment 1706 detects and compensates the delay differences across multiple channels to less than one nanosecond.

One or more of the components illustrated in FIG. 17 may be implemented in specialized circuitry configured to perform the noted functions, or one or more of the components may be implemented by one or more processors executing instructions to perform the noted functions.

Figure 18:
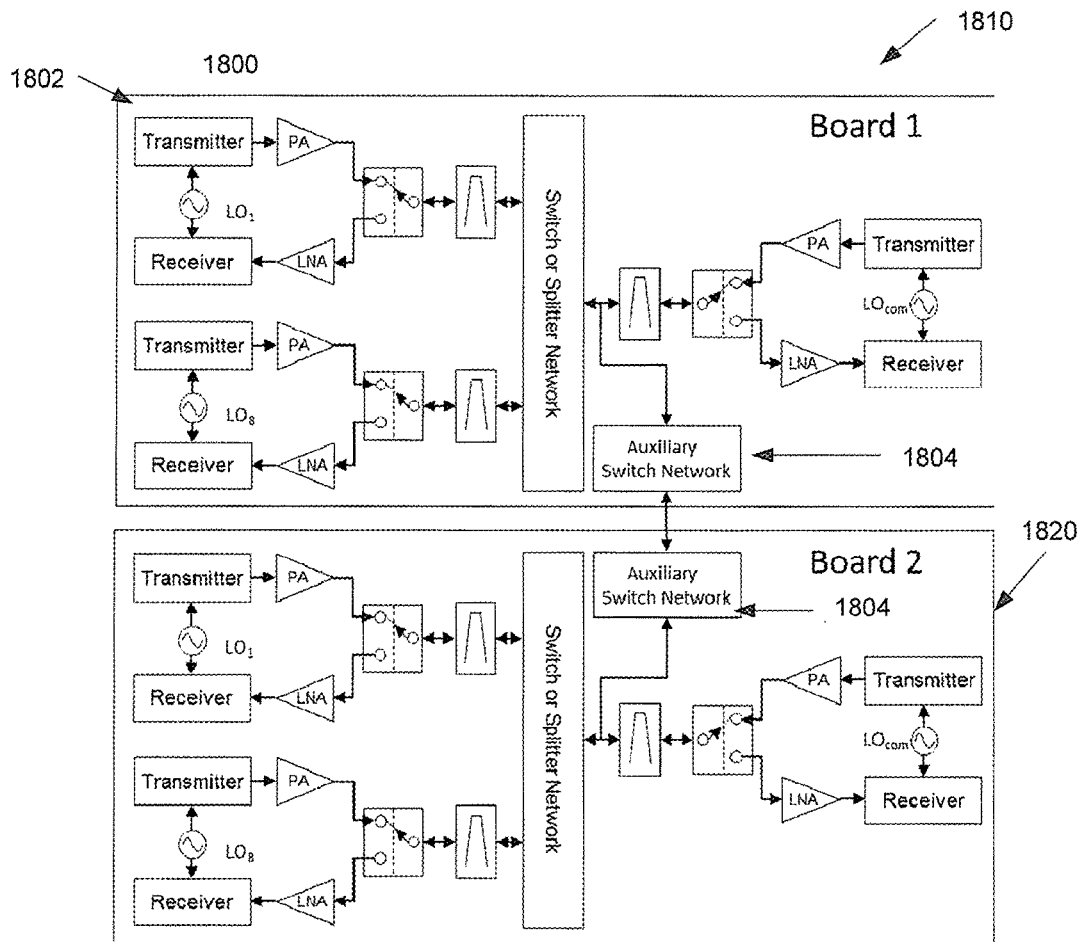
FIG. 18 illustrates an example unit diagram of a calibration circuit according to an exemplary embodiment of the disclosure.

FIG. 18 illustrates an example unit diagram of a calibration circuit 1800 for a Tx and an Rx according to an exemplary embodiment of the disclosure. The embodiment of the calibration circuit 1800 shown in FIG. 18 is for illustration only. Other embodiments of the calibration circuit 1800 could be used without departing from the scope of this disclosure.

As illustrated in FIG. 18, the calibration circuit 1800 comprises a plurality of RF front-ends 1802, a board 1 1810, and a board 2 1820. As illustrated in FIG. 3, 32 RF front-ends (such as 1802 illustrated in FIG. 18) are distributed on the 4 physically independent boards (such as the board 1 1820 and the board 2 1820) each of which include 8 RF front-ends (such as 1802 illustrated in FIG. 18). The four boards (such as 1810, 1820 illustrated in FIG. 18) are connected to the baseband signal processing unit 306 through the four CPRI connections 308. The RF front-end 1802 includes a common Tx and a common Rx channel. A calibration function is achieved across the 8 Tx and Rx channels in a single board (such as board 1 and board 2 illustrated in FIG. 18). An auxiliary switch network 1804 is equipped on each of boards 1810, 1820. With the assistance of the auxiliary network 1804, the calibration functionality is performed for all 32 channels (such as 32 RF front-ends, RFUs).

A large-scale antenna system (such as MIMO, or FD-MIMO) in a wireless communication system refers to a communication system with a large number of transmit antennas (Txs) at BS (such as tens or hundreds of Txs). With a large number of Txs employed at BS, a communication system offers rich spatial degrees of freedom and thus is capable of supporting high-order MU-MIMO transmissions.

A precoding scheme is commonly used to suppress intra-user interference in MU-MIMO transmissions and plays a critical role in a system performance. To be more specific, maximum ratio transmission (MRT) (such as conjugate beamforming) has a low implementation complexity and maximizes signal strength of an intended UE. However, the MRT scheme does not take intra-user interference into account. Thus, the MRT does not perform well in the interference-limited scenario, where noise is much weaker than interference. A zero forcing (ZF) precoding scheme attempts to null intra-user interference at the expense of noise enhancement. In the noise-limited scenario where interference is much weaker than noise, the ZF precoding suffers a considerable performance loss.

One or more of the components illustrated in FIG. 18 may be implemented in specialized circuitry configured to perform the noted functions, or one or more of the components may be implemented by one or more processors executing instructions to perform the noted functions.

Figure 19:
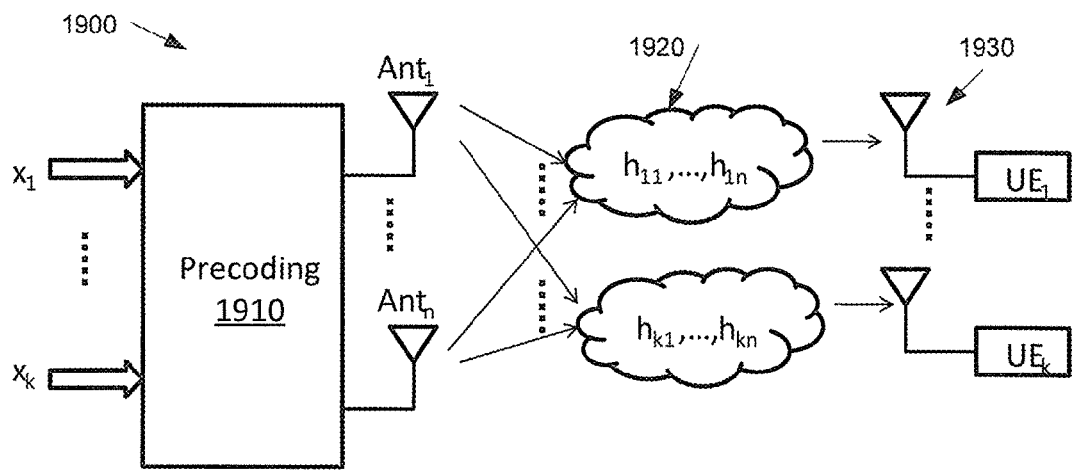
FIG. 19 illustrates an example unit diagram of a large-scale antenna system according to an exemplary embodiment of the disclosure.

FIG. 19 illustrates an example unit diagram of a large-scale antenna system 1900 according to an exemplary embodiment of the disclosure. The embodiment of the large-scale antenna system 1900 shown in FIG. 19 is for illustration only. Other embodiments of the large-scale antenna system 1900 could be used without departing from the scope of this disclosure.

As illustrated in FIG. 19, the large-scale antenna system 1900 comprises a large-scale transmit antenna system at an eNB 1910, a plurality of channel matrix 1920, and a plurality of receive antenna systems 1930.

One or more of the components illustrated in FIG. 19 may be implemented in specialized circuitry configured to perform the noted functions, or one or more of the components may be implemented by one or more processors executing instructions to perform the noted functions.

In certain embodiments, N, $M_k$, K, and $Q_k$ are defined as a number of the Tx antennas at eNB, a number of receive antennas (Rxs) at a UE, a number of co-scheduled UEs, and a number of data streams at UE k, respectively, for a large-scale antenna system operation. As illustrated in FIG. 19, at a specific subcarrier used for UE-specific reference signals and data, the received signals at the UE k is obtained in accordance with equation (10):

$$y_k = H_k W_k x_k + H_k \Sigma_{i \neq k} W_i x_i + n_k, k=1, \ldots, K \quad (10)$$

where $H_k$ denotes the $M_k \times N$ channel matrix between eNB and UE k, $W_k$ denotes the $N \times Q_k$ precoding matrix for the UE k, $x_k$ denotes the transmitted signals at UE k, and $n_k$ denotes the additive white Gaussian noise at UE k, i.e., $n_k \sim CN(0, \sigma^2 I_{M_k})$.

In certain embodiments, an SLNR-based precoding technique is used. In such embodiments, a channel matrix is obtained in accordance with equation (11) and (12):

$$\overline{H}_k = [H_1^T \ldots H_{k-1}^T H_{k+1}^T \ldots H_K^T]^T : a\ \Sigma_{i \neq k}^K M_i \times N \text{ matrix} \quad (11)$$

$$H = [H_1^T H_2^T \ldots H_K^T]^T : a\ \Sigma_{k=1}^K M_k \times N \text{ matrix} \quad (12)$$

A total transmitted power per user is constrained by $E[x_k x_k^H] = I_{Q_k}$ with $I_{Q_k}$ denoting a $Q_k \times Q_k$ matrix, and the precoding matrix satisfies the two constraints such as $Tr(W_k^H W_k) = Q_k$, where $Tr(\cdot)$ denotes the trace of a matrix and $W_k^H H_k^H W_k H_k = D_k$ with $D_k$ denoting a diagonal matrix. The latter constraint is due to the assumption that matched filters are employed at Rxs. In the SLNR-based precoding scheme, the precoding matrix $W_k$ is chosen to maximize the following quantity in accordance with equation (13):

$$SLNR_k = \frac{Tr(W_k^H H_k^H H_k W_k)}{Tr(W_k^H (c_k I_N + \overline{H}_k^H \overline{H}_k) W_k)} \quad (13)$$

where $c_k$ is defined as $M_k \sigma^2 / Q_k$ and $I_N$ is an $N \times N$ identity matrix.

Mathematically, finding an optimal precoding matrix $W_k$ is formulated in accordance with equation (14):

$$W_k = \arg\max_{W_k} SLNR_k \quad (14)$$

where $Tr(W_k^H W_k) = Q_k$ and $W_k^H H_k^H W_k H_k = D_k$ for a diagonal matrix $D_k$.

In particular, when the precoding matrix $W_k$ is a $N \times 1$ vector, the $SLNR_k$ is re-written in accordance with equation (15):

$$SLNR_k = \frac{Tr(w_k^H H_k^H H_k w_k)}{Tr(w_k^H (c_k I_N + \overline{H}_k^H \overline{H}_k) w_k)} = \frac{w_k^H H_k^H H_k w_k}{w_k^H (c_k I_N + \overline{H}_k^H \overline{H}_k) w_k} \quad (15)$$

In this case, the optimization problem given in (14) is re-written in accordance with equation (16):

$$W_k = \arg\max_{W_k} \frac{w_k^H H_k^H H_k w_k}{w_k^H (c_k I_N + \overline{H}_k^H \overline{H}_k) w_k} \quad (16)$$

The optimal solution $w_k$ to the generalized Rayleigh quotient problem is given by $w_k$=the most dominant eigenvector of $(cI_N + \overline{H}_k^H \overline{H}_k)^{-1} H_k^H H_k$.

In certain embodiments, every UE has one Rx antenna (such as $M_1 = M_2 = \ldots = M_K = 1$). In this case, the channel matrix $H_k$ is a $N \times 1$ vector for $k=1, \ldots, K$. In addition, $Q_1 = Q_2 = \ldots = Q_K = 1$ since $1 \leq Q_k \leq M_k$ for $k=1, \ldots, K$. It implies $c_1 = c_2 = \ldots = c_K$ (such as all $c_k$ for $k=1, \ldots, K$ are equal to a constant c). Thus, the precoding matrix $w_k$ is also a $N \times 1$ vector. The precoding vector $w_k$ for $M_k = 1$ is given by $w_k$=the most dominant eigenvector of $(cI_N + \overline{H}_k^H \overline{H}_k)^{-1} h_k^H h_k$.

In certain embodiments, every UE receives a single stream (such as $Q_1 = Q_2 = \ldots = Q_K = 1$). The channel matrix is not necessarily a vector. However, the optimal precoding matrix $w_k$ is still a $N \times 1$ vector, that is given by $w_k$=the most dominant eigenvector of $(cI_N + \overline{H}_k^H \overline{H}_k)^{-1} H_k^H H_k$.

In certain embodiments, there exists an N×N invertible matrix $T_k$. In such embodiments, the following equations (17) and (18) are satisfied simultaneously:

$$T_k^H H_k^H H_k T_k = \Sigma_k \qquad (17)$$

$$T_k^H(c_k I_N + \overline{H}_k^H \overline{H}_k) T_k = I_N \qquad (18)$$

The optimal precoding matrix $W_k$ that maximizes $SLNR_k$ in equation 13 given by $W_k = \rho T_k(:,1:Q_k)$, where $\rho$ is a normalization factor such as $\text{Tr}(W_k^H W_k) = Q_k$.

The major computational complexity for obtaining the precoding matrix $W_k$ lies in the step for finding the non-singular solution $T_k$ to the classical simultaneous diagonalization problem. Conventionally, the solution to the classical simultaneous diagonalization problem is obtained in accordance with following steps. At step 1, Cholesky factorization is applied for the matrix $C_k I_N + \overline{H}_k^H \overline{H}_k$ to obtain $C_k I_N + \overline{H}_k^H \overline{H}_k = L_k L_k^H$, where $L_k$ is a N×N lower triangular matrix. And then compute the matrix $P_k = L_k^{-1} H_k^H H_k L_k^{-H}$. At step 2, symmetric QR scheme is applied to compute the Schur decomposition of the matrix $P_k^H H_k^H H_k P_k$ to obtain $P_k^H H_k^H H_k P_k = Y_k \Sigma_k Y_k^H$, where $Y_k$ is a unitary matrix and $\Sigma_k$ is a diagonal matrix. The non-singular solution $T_k$ to the classical simultaneous diagonalization problem is given by $T_k = L_k^{-H} Y_k$. Accordingly, the matrix $T_k$ satisfies: $T_k^H(c_k I_N + \overline{H}_k^H \overline{H}_k) T_k = I_N$. At the last step, the precoding matrix $W_k = \rho T_k(:,1:Q_k)$.

Table 6 shows the steps to obtain a single Cholesky decomposition when all $c_k$ are the same, i.e., $c_1 = c_2 = \ldots = c_K$.

TABLE 6

| | |
|---|---|
| Step 1: | compute $H^H H + c_k I_N$ for $k = 1, \ldots, K$ |
| Step 2: | apply Cholesky decomposition to $H^H H + c_k I_N$ and obtain $H^H H + c_k I_N = D_k^H D_k$, where $D_k$ is an N × N upper triangular matrix for $k = 1, \ldots, K$; |
| Step 3: | compute the inverse of the upper triangular matrix $D_k$. Define $L_k = D_k^{-1}$; |
| Step 4: | For UE $k = 1, \ldots, K$, apply singular value decomposition (SVD) to $H_k L_k = U_k \Sigma_k V_k^H$; |
| Step 5: | Output: the precoding matrix $W_k$, $$W_k = \beta L_k V_k (I_{N_t} - \Sigma_k^2)^{-\frac{1}{2}} [I_{Q_k}; 0]^T$$ ($\beta$ for power normalization). |

In certain embodiments, a matrix operation (such as Cholesky or Schur decompositions) is implemented by different schemes that have different cons and pros. Table 7 shows assumptions that arithmetic with individual elements has complexity $O(1)$.

TABLE 7

| Cases | Computational complexity of obtaining K precoding matrices (vectors) $W_k$ (or $w_k$) |
|---|---|
| Case 1) Every UE has one Rx antenna | 1) K times matrix inversion of a N × N matrix $cI_N + \overline{H}_k^H \overline{H}_k$: $O(N^3 K)$<br>2) A matrix-vector multiplication of a N × N matrix $(cI_N + \overline{H}_k^H \overline{H}_k)^{-1}$ and a N × 1 vector $h_k^H$: $O(N^2)$<br>3) A vector-vector multiplication of a N × 1 vector $(cI_N + \overline{H}_k^H \overline{H}_k)^{-1} h_k^H$ and a 1 × N vector $h_k$: $O(N^2)$<br>4) finding the most dominant eigenvector $(cI_N + \overline{H}_k^H \overline{H}_k)^{-1} h_k^H h_k$: $O(N^2)$ |
| Case 2) Every UE receives a single stream | 1) matrix multiplication of $\overline{H}_k^H \overline{H}_k$: $O(N^2 \Sigma_{i=1}^K M_i)$<br>2) K times matrix inversion of a N × N matrix $cI_N + \overline{H}_k^H \overline{H}_k$: $O(N^3 K)$<br>3) A matrix-vector multiplication of a matrix $(cI_N + \overline{H}_k^H \overline{H}_k)^{-1}$ and a N × $\Sigma_{i=1}^K M_i$ matrix $H_k^H$: $O(N^2 \Sigma_{i=1}^K M_i)$ |

TABLE 7-continued

| Cases | Computational complexity of obtaining K precoding matrices (vectors) $W_k$ (or $w_k$) |
|---|---|
| | 4) A vector-vector multiplication of a N × 1 vector $(cI_N + \overline{H}_k^H \overline{H}_k)^{-1} H_k^H$ and a $M_k$ × N matrix $H_k$: $O(N^2 M_k)$<br>5) finding the most dominant eigenvector $(cI_N + \overline{H}_k^H \overline{H}_k)^{-1} H_k^H H_k$: $O(N^2)$ |
| Case 3) Generalized N × N invertible matrix | 1) matrix multiplication of $\overline{H}_k^H \overline{H}_k$: $O(N^2 \Sigma_{i=1}^K M_i)$<br>2) K times the Cholesky factorization for the matrix $c_k I_N + \overline{H}_k^H \overline{H}_k$: $O(N^3 K)$<br>2) K times matrix inversion of an N × N lower triangular matrix $L_k$: $O(N^3)$<br>3) Compute the matrix multiplication $P_k = L_k^{-1} H_k^H H_k L_k^{-H}$: $O(N^3)$<br>4) QR algorithm to compute the Schur decomposition of $P_k^H H_k^H H_k P_k$ to obtain $Y_k$: $O(N^3)$<br>6) Output the matrix $W_k = L_k^{-H} Y_k [I_{Q_k}; 0]^T$: $O(N^3)$ |
| Case 4) Matrix operations (such as Cholesky or Schur decompositions) | 1) one matrix multiplication of $H^H H$: $O(N^2 \Sigma_{k=1}^K M_k)$<br>2) K times the Cholesky factorization for the matrix $c_k I_N + H^H H$: $O(N^3 K)$<br>For all the same $c_k$, only one Cholesky factorization of $cI_N + H^H H$ is required<br>2) K times matrix inversion of an N × N lower triangular matrix $L_k$: $O(N^3)$<br>For all the same $c_k$, only one matrix inversion of $L_k$ is required<br>3) apply singular value decomposition (SVD) to $H_k L_k = U_k \Sigma_k V_k^H$: $O(M_k N^2)$<br>4) Compute the precoding matrix $$W_k = \beta L_k V_k (I_{N_t} - \Sigma_k^2)^{-\frac{1}{2}} [I_{Q_k}; 0]^T : O(N^3)$$ |

In Table 7, it is assumed that matrix multiplication and matrix inversion are performed in a straightforward manner. Alternatively, additional computation schemes are not considered to the compute matrix multiplication and matrix inversion. Since all schemes are assumed to adopt the same matrix multiplication and matrix inversion schemes if any, Table 7 is used to investigate the relative difference in terms of computational complexity among different schemes.

In certain embodiments, a UE has one Rx antenna (such as case 1 shown in Table 7). In such embodiments, the precoding vector $w_k$ (such as $M_1 = M_2 = \ldots = M_K = 1$) is obtained in accordance with equation (19):

$$w_k := \frac{1}{1-s}(cI_N + H^H H)^{-1} h_k^H \qquad (19)$$

where $s = \frac{\lambda}{1+\lambda}$ with $\lambda := h_k(cI_N + \overline{H}_k^H \overline{H}_k)^{-1} h_k^H$.

Alternatively, the precoding vector $w_k$ is expressed in accordance with equation (20):

$$w_k := \beta(cI_N + H^H H)^{-1} h_k^H \qquad (20)$$

where $\beta$ is a normalized factor to ensure $\text{Tr}(w_k^H w_k) = 1$.

In such embodiments, a single matrix inversion of a N×N matrix is computed for computing all K precoding vectors. The overall computational complexity is $O(N^3) + O(N^2)$. As shown in Table 7, substantial savings in computational complexity is achieved as compared with the case 1 shown in Table 7 (such as a UE has one Rx antenna). Alternatively, the case 3 (such as generalized N×N invertible matrix) shown in Table 7 is used to solve the case 1 with a computational complexity of $O(N^3)$. However, the solution for the case 4 is still much higher than the solution presented in the case 1 for a large value of N, that is due to the fact that the solution in the case 4 involves two times matrix operations of order $O(N^3)$.

In certain embodiments, a precoding vector $w_k$ for the case 1 (such as $M_1=M_2=\ldots=M_K=1$,) shown in Table 7 is obtained by $$w_k = \frac{1}{1-s} H^H \times \text{the } kth \text{ column of } (cI_K + HH^H)^{-1} \text{ Alternatively,}$$

the precoding vector $w_k$ is expressed as $w_k := \beta H^H \times$ the kth column of $(cI_K+HH^H)^{-1}$ where $\beta$ is a normalized factor to ensure $\text{Tr}(w_k^H w_k)=1$.

In such embodiments, only a single matrix inversion of a K×K matrix is needed for computing all K precoding vectors. In a large scale antenna system (such as N>>K), the method for the case 2 scheme involves much smaller computational complexity than the method for the case 1 while achieving the identical performance. Therefore, the method for the case 2 is more suitable for a large scale antenna system as compared with the method for the case 1.

In certain embodiments, the precoding vector $w_k$ (such as the case 2 shown in Table 7, $Q_1=Q_2=\ldots=Q_K=1$) is obtained by $w_k=$ the most dominant eigenvector of $(c_k I_N + H^H H)^{-1} H_k^H H_k$. The most dominant eigenvector $w_k$ for $k=1,\ldots,K$ is computed in the following steps. At step 1, a symmetric QR scheme is applied to compute the Schur decomposition of the matrix $H^H H$ such as $H^H H = U \Lambda U^H$, where U is a N×N unitary matrix and $\Lambda$ is a N×N diagonal matrix with non-negative entries. The QR scheme to compute the Schur decomposition of a N×N symmetric matrix has computational complexity of order $O(N^3)$. The matrix $(c_k I_N + H^H H)^{-1}$ is readily obtained as $(c_k I_N + H^H H)^{-1} = U(c_k I_N + \Lambda)^{-1} U^H$. Thus, the computation of $(c_k I_N + H^H H)^{-1}$ has computational complexity of order $O(N^3)$. In the case that all $c_k$ are the same (such as equal to c), $(cI_N+H^H H)^{-1}$ is only needed to perform once. At step 2, $(C_k I_N + H^H H)^{-1} H_k^H H_k$ is computed that has computational complexity of order $O(N^2 \Sigma_{i \neq k} M_i)$. At step 3, the most dominant eigenvector of $(c_k I_N + H^H H)^{-1} H_k^H H_k$ is computed that has complexity of $O(N^2 M_k)$.

As shown Table 7, the method given for the case 3 reduces the number of matrix inversions by a factor of K in the case that all $c_k$ are the same, as compared with the method for the case 3 shown in Table 7.

In certain embodiments, a precoding vector $w_k$ (such as the case 2 shown in Table 7, $Q_1=Q_2=\ldots=Q_K=1$) is obtained by $w_k=$ the most dominant eigenvector of $$\left(\frac{I_N}{c_k} - \frac{1}{c_k} H^H (c_k I_M + HH^H)^{-1} H\right) H_k^H H_k,$$

where $M=\Sigma_{k=1}^K M_k$.

In such embodiments, the most dominant eigenvector $w_k$ for $k=1,\ldots,K$ is computed in the following steps. At step 1, a symmetric QR scheme is applied to compute the Schur decomposition of the matrix $HH^H$ such as $HH^H=V\Sigma V^H$, where V is a M×M unitary matrix and $\Sigma$ is a M×M diagonal matrix with non-negative entries, where $M=\Sigma_k M_k$. The QR scheme to compute the Schur decomposition of a M×M symmetric matrix has computational complexity of order $O(M^3)$. The matrix $(c_k I_M + HH^H)^{-1}$ is readily obtained as $(c_k I_M+HH^H)^{-1}=V^H(c_k I_N+\Sigma)^{-1}V$. Thus, the computation of $(c_k I_M+HH^H)^{-1}$ has complexity of order $O(M^3)$. In addition, computing $H^H (c_k I_M+HH^H)^{-1} H$ requires max (O $(NM^2)$, $O(N^2 M)$).

In the case that all $c_k$ are the same (such as equal to c), $$\left(\frac{I_N}{c} - \frac{1}{c} H^H (cI_M + HH^H)^{-1} H\right)$$

is only needed to be computed once. At step 2, the $$\left(\frac{I_N}{c_k} - \frac{1}{c_k} H^H (c_k I_M + HH^H)^{-1} H\right) H_k^H H_k$$

that has computational complexity of order $O(N^2 \Sigma_{i \neq k} M_i)$ is computed. At step 3, the most dominant eigenvector of $$\left(\frac{I_N}{c_k} - \frac{1}{c_k} H^H (c_k I_M + HH^H)^{-1} H\right) H_k^H H_k$$

that has complexity of $O(N^2 M_k)$ is computed.

In such embodiments, only a matrix inversion of a M×M matrix is computed. In a large scale antenna system, a number of Txs at a BS, N, is much larger than M. Thus, a method in this embodiment has much smaller computational complexity than one a method for the case 3 shown in Table 7. Similar to the method for the case 3 shown in Table 7, the method given for the case 4 reduces a number of matrix inversions by a factor of K in the case that all $c_k$ are the same, as compared with the methods shown in Table 7.

In certain embodiments, the precoding matrix $W_k$ (such as the case 3, Generalized N×N invertible matrix) is obtained by using the following steps. At step 1, a thin SVD to $H^H$ is applied to obtain the matrices U and $\Sigma$ in the thin SVD, where U is a N×M unitary matrix and $\Sigma$ is a M×M diagonal matrix with non-negative diagonal entries such that $U^H U = I_N$. For M<<N, this step has complexity of $O(N^2 M)$. At step 2, the following matrix is defined as $$P_k = U(c_k I_M + \Sigma)^{-\frac{1}{2}}.$$

Clearly, the matrix $P_k$ satisfies: $P_k^H(c_k I_N+H^H H)P_k=I_M$. At step 3, an EVD is applied to the matrix $P_k^H H_k^H H_k P_k$ to obtain $P_k^H H_k^H H_k P_k = Y_k \Sigma_k Y_k^H$, where $Y_k$ is a unitary matrix and $\Sigma_k$ is a M×M diagonal matrix. The non-singular solution $T_k$ to the classical simultaneous diagonalization problem is given by $$T_k = U(c_k I_M + \Sigma)^{-\frac{1}{2}} Y_k.$$

In certain embodiments, single antenna UEs is extended to multi-antenna UEs using the same principles. In case 3 and case 4 shown in Table 7, an implicit assumption is that all UEs have identical receive SNR (such as $\sigma_1^2 = \ldots = \sigma_K^2$). However, this assumption is not hold in practice as UEs that have different SNRs. In addition, for FDD systems, channel state information (CSI) is obtained via a PMI feedback where only directional information is captured. Assume an eNB knows $\sigma_k^2$, it assumes the signal model for precoding in accordance with equation (21):

$$y'_k = \frac{y_k}{\sigma_k} \tag{21}$$

-continued $$= \sqrt{\frac{p_k}{\sigma_k}} h_k^H w_k s_k + \sqrt{\frac{p_k}{\sigma_k}} h_k^H \sum_{i \neq k} w_i s_i + n'_k$$

$$= \sqrt{p'_k} h_k^H w_k s_k + \sqrt{p'_k} h_k^H \sum_{i \neq k} w_i s_i + n'_k$$

where $h_k$ is normalized channel, and $p_k$ and $p'_k$ are channel amplitude before and after noise normalization, respectively.

Accordingly, $w_k := \alpha_k \times$ the kth column of $(H((P')^{-1} + H^H H)^{-1})$ is obtained. Or equivalently, $w_k := \alpha_k \times$ the kth column of $$\left( HP'^{\frac{1}{2}} \left( I + P'^{\frac{1}{2}} H^H H P'^{\frac{1}{2}} \right)^{-1} \right)$$

is obtained. Where $P' = \mathrm{diag}(p'_1, \ldots, p'_K)$ and H is normalized with a unit norm. In one embodiment, H is approximated by PMI and $p'_k$ is approximated by CQI/SINR feedback from a UE.

In certain embodiments, a precoder for the UE k is designed assuming PMI or in general the channel direction for UE k is $u_k$, and the SINR (after mapping of CQI feedback) is $\rho_k$. In such embodiments, the precoder is obtained in accordance with $$w_k := \text{normarlized the } kth \text{ column of } \left( U \left( \mathrm{diag}\left( \frac{1}{\rho_1}, \ldots, \frac{1}{\rho_K} \right) + H^H H \right)^{-1} \right).$$

Or equivalently, define $$P_{snr} = \mathrm{diag}\left( \frac{1}{\rho_1}, \ldots, \frac{1}{\rho_K} \right).$$

Accordingly $$w_k := \text{normarlized the } kth \text{ column of } \left( U P_{snr}^{\frac{1}{2}} \left( I + P_{snr}^{\frac{1}{2}} U^H U P_{snr}^{\frac{1}{2}} \right)^{-1} \right)$$

is obtained.

In such embodiments, the followings mathematical extensions are applied.

Observation 1: $((cI_N + \overline{H}_k^H \overline{H}_k)^{-1} h_k^H h_k)$ is a rank one matrix and thus it has only one non-zero eigenvalue.

Reason: rank $(h_k^H h_k) = 1$ and $(cI_N + \overline{H}_k^H \overline{H}_k)$ is a full-rank matrix.

Observation 2: $w_k := ((cI_N + \overline{H}_k^H \overline{H}_k)^{-1} h_k^H$ is the most dominant eigenvector.

Reason: Define $:= ((cI_N + \overline{H}_k^H \overline{H}_k)^{-1} h_k^H h_k)$, The following equation is obtained:

$$A w_k = h_k (cI_N + \overline{H}_k^H \overline{H}_k)^{-1} h_k^H (cI_N + \overline{H}_k^H \overline{H}_k)^{-1} h_k^H$$

$$= h_k (cI_N + \overline{H}_k^H \overline{H}_k)^{-1} h_k^H w_k$$

$$= \lambda w_k$$

where $\lambda := h_k (cI_N + \overline{H}_k^H \overline{H}_k)^{-1} h_k^H$. Sine $h_k$ is a non-zero vector and $(cI_N + \overline{H}_k^H \overline{H}_k)^{-1}$ is positive definite, $\lambda$ is a non-zero eigenvalue and $v$ is the corresponding eigenvector. As $(cI_N + \overline{H}_k^H \overline{H}_k)^{-1} h_k^H h_k$ has only one non-zero eigenvalue, $v := ((\sigma^2 I_N + \overline{H}_k^H \overline{H}_k)^{-1} h_k^H$ is the most dominant eigenvector.

Observation 3: $\lambda := h_k (cI_N + \overline{H}_k^H \overline{H}_k)^{-1} h_k^H$ can be written as $$\lambda = \frac{s}{1-s},$$

where $S = h_k (cI_N + H^H H)^{-1} h_k^H$.

Reason: Define $B := cI_N + \overline{H}_k^H \overline{H}_k$. Clearly, $\lambda = h_k (cI_N + \overline{H}_k^H \overline{H}_k)^{-1} h_k^H = h_k B^{-1} h_k^H$.

and $cI_N + H^H H = B + h_k^H h_k$. By matrix inversion lemma, the following equations are obtained:

$$(cI_N + H^H H)^{-1} = (B + h_k^H h_k)^{-1} = B^{-1} - \frac{B^{-1} h_k^H h_k B^{-1}}{1 + h_k B^{-1} h_k^H}. \quad \text{EQ 3}$$

$$h_k (cI_N + H^H H)^{-1} h_k^H = h_k B^{-1} h_k^H - \frac{h_k B^{-1} h_k^H h_k B^{-1} h_k^H}{1 + h_k B^{-1} h_k^H}. \quad \text{EQ 4}$$

By definition of $\lambda$ and $s$ and EQ 4, $$s = \frac{\lambda}{1+\lambda}.$$

Then, $$\lambda = \frac{s}{1-s} \text{ and } 1 + \lambda = \frac{1}{1-s}.$$

Observation 4: $w_k := ((cI_N + \overline{H}_k^H \overline{H}_k)^{-1} h_k^H$ can be rewritten as $$w_k := \left( cI_N + \overline{H}_k^H \overline{H}_k \right)^{-1} h_k^H = \frac{1}{1-s} (cI_N + H^H H)^{-1} h_k^H.$$

Reason: From EQ 3, the following equation is obtained:

$$(cI_N + H^H H)^{-1} h_k^H = \frac{1}{1+\lambda} B^{-1} h_k^H = \frac{1}{1+\lambda} v.$$

Observation 5: $(cI_N + H^H H)^{-1} H^H$ can be rewritten as $H^H (cI_K + HH^H)^{-1}$.

Reason: Notice that $$(cI_N + H^H H) H^H = \sigma^2 H^H + H^H H H^H = H^H (cI_K + HH^H).$$

Observation 6:

$$w_k = \frac{1}{1-s} H^H \times \text{the } kth \text{ column of } (cI_K + HH^H)^{-1}$$

Reason: $(cI_N + H^H H)^{-1} h_k^H$ is just the kth column of $(cI_N + H^H H)^{-1} H^H$, which is the kth column of $H^H (cI_K + HH^H)^{-1}$. Notice that the matrix $H^H (cI_K + HH^H)^{-1}$ only involves an inverse of K×K matrix, which has low computational complexity for a small k. In short, there are four equivalent forms of the SLNR beamforming vectors.

$w_k$=the most dominant eigenvector of $((cI_N+\overline{H}_k^H \overline{H}_k)^{-1}h_k^H h_k)$;  Expression 1 (original):

$w_k := ((cI_N+\overline{H}_k^H \overline{H}_k)^{-1}h_k^H$;  Expression 2:

$$w_k := \frac{1}{1-s}(cI_N + H^H H)^{-1}h_k^H;$$  Expression 3

$$w_k := \frac{1}{1-s}H^H \times \text{the } k\text{th column of } (cI_K + HH^H)^{-1};$$  Expression 4

In such embodiments, the following mathematical extensions are also applied. Since $C_k I_N+H^H H=C_k I_N+\overline{H}_k^H \overline{H}_k+H_k^H H_k$, the following equation is obtained:

$Tr(W_k^H(c_k I_N+\overline{H}_k^H \overline{H}_k)W_k)=Tr(W_k^H(c_k I_N+H^H H)W_k)-Tr(W_k^H H_k^H H_k W_k)$.

Define $\mu_k:=Tr(W_k^H H_k^H H_k W_k)$ and $\rho_k:=Tr(W_k^H(c_k I_N+LW H)W_k)$. Clearly, $$0 < \frac{\mu_k}{\rho_k} < 1.$$

Hence, $SLNR_k$ can be rewritten as $$SLNR_k = \frac{\mu_k}{\rho_k - \mu_k} = \frac{\frac{\mu_k}{\rho_k}}{1 - \frac{\mu_k}{\rho_k}}.$$

As $SLNR_k$ is a monotonically increasing function of $\mu_k/\rho_k$, maximizing $SLNR_k$ is equivalent to maximizing $$\frac{\mu_k}{\rho_k}.$$

Thus, the optimization problem given in EQ1 is equivalent to the following problem:

$$SLNR_k = \frac{\mu_k}{\rho_k} = \frac{Tr(W_k^H H_k^H H_k W_k)}{Tr(W_k^H(c_k I_N + H^H H)W_k)}.$$

At step 1, EVD for the matrix $H^H H$ to obtain $H^H H=X\Lambda X^H$ is applied, where X is an $N \times \Sigma_{k=1}^{K} M_k$ unitary matrix and $\Lambda$ is a diagonal matrix with non-negative diagonal entries. Note that $H^H H$ is independent of the UE index. Accordingly, the following equation is obtained as $$P_k = X_k \Lambda_k^{-\frac{1}{2}},$$

where the matrix $P_k$ satisfies: $P_k^H(c_k I_N+\overline{H}_k^H \overline{H}_k)P_k=I_N$.

At step 2, EVD to the matrix $P_k^H H_k^{HH} H_k P_k$ to obtain $P_k^H H_k^H H_k P_k=Y_k \Sigma_k Y_k^H$ is applied, where $Y_k$ is a unitary matrix and $\Sigma_k$ is a diagonal matrix. The non-singular solution $T_k$ to the classical simultaneous diagonalization problem is given by $$T_k = X_k \Lambda_k^{-\frac{1}{2}} Y_k.$$

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a large scale antenna array in a wireless communication system, the method comprising:
   receiving, by a base station (BS), one or more signals, the one or more signals including information for beamforming to a plurality of user equipments (UEs) using a full-dimensional multiple-input multiple-output (FD-MIMO) beamforming scheme, wherein the FD-MIMO beamforming scheme includes same time resources and same frequency resources that are co-scheduled to the plurality of UEs;
   determining and compensating for, by the base station, a time delay of the one or more signals associated with one or more antenna arrays that are distributed in the large scale antenna array, wherein determining and compensating further comprises:
      detecting a sample level mismatch for each of a plurality of common public radio interface (CPRI) connections associated with one or more antenna arrays that are distributed in the large scale antenna array;
      compensating for the detected sample level mismatch for each of the plurality of CPRI connections;
      detecting delay differences within channels in the plurality of CPRI connections introduced by components therein;
      compensating for the detected delay differences within the channels in the plurality of CPRI connections to less than 1 nanosecond; and
   performing a multi-user (MU) joint beamforming on the one or more signals to one or more UEs based upon the determined and compensated time delay.

2. The method of claim 1 further comprising:
   performing a virtualization of the one or more antenna array in accordance with a 2 dimensional (2D) plane associated with a signal generated from a precoder;
   updating the precoder in accordance with an estimation of a plurality of channels, wherein the estimation of the plurality of channels is performed on a per resource block (RB) basis; and
   transmitting the one or more signal at the one or more antenna arrays to the plurality of UEs using the FD-MIMO beamforming scheme.

3. The method of claim 2, wherein updating the precoder comprises:
   estimating one or more uplink channel, wherein the one or more uplink channel comprises one or more per frequency resource element (RE) in accordance with a per RB based precoder generation associated with one or more sounding reference signal (SRS);
   assigning four SRS symbols to two radio sub-frames included in the radio frame each of which includes two SRS symbols; and
   predicting a channel quality information to compensate a difference between a channel quality indicator (CQI) received from the plurality of UEs and a desired CQI using a gain difference value between a beamformed gain and a virtualized gain.

4. The method of claim 2, further comprising:
performing precoding using a low complexity precoding scheme that reduces K times of matrix inversion to 1 time and an N×N dimension of matrix inversion to a K×K, wherein the low complexity precoding scheme is determined in accordance with a channel matrix that is approximated by a precoding matrix indicator (PMI) and a signal to interference noise ratio (SINR) that is obtained after mapping of a CQI feedback.

5. The method of claim 4, wherein the K is determined as a number of UEs being served and the N is determined as a number of antennas to be used to transmit antenna beams to the UEs.

6. The method of claim 1, wherein the large scale antenna array comprises a plurality of vertically arranged panels each of which includes a plurality of sub-arrays that is arranged in an n number horizontal ×1 vertical configuration, each of the sub-arrays including a plurality of patch elements fed with a corporate feed network.

7. The method of claim 1, further comprising performing a timing and phase alignment for distributed radio frequency units that connect a base band unit of the BS through separate common public radio interface connections.

8. The method of claim 1, wherein the large scale antenna array comprises one or more virtualization pattern including one or more time domain symbol and multiple virtualized symbols, the large scale antenna array activating one or more antenna element.

9. The method of claim 1, wherein a scrambling identification (SCID) is allocated into one or more demodulation reference signal (DMRS) port that is mapped to one or more co-scheduled UEs that share the same time resources and the same frequency resources.

10. The method of claim 1, wherein compensating for the detected delay differences further comprises compensating for the detected delay differences within the channels in the plurality of CPRI connections to less than 1 nanosecond.

11. A base station (BS) comprising:
a large scale antenna array;
at least one transceiver configured to receive one or more signals, the one or more signals including information for beamforming to a plurality of user equipments (UEs) using a full-dimensional multiple-input multiple-output (FD-MIMO) beamforming scheme, wherein the FD-MIMO beamforming scheme includes same time resources and same frequency resources that are co-scheduled to the plurality of UEs; and
at least one hardware controller configured to:
determine and compensate for a time delay of the one or more signals associated with one or more antenna arrays that are distributed in the large scale antenna array, the determination and compensation further configures the at least one hardware controller to:
detect a sample level mismatch for each of a plurality of common public radio interface (CPRI) connections associated with one or more antenna arrays that are distributed in the large scale antenna array;
compensate for the detected sample level mismatch for each of the plurality of CPRI connections;
detect delay differences within channels in the plurality of CPRI connections introduced by components therein;
compensate for the detected delay differences within the channels in the plurality of CPRI connections; and
perform a multi-user (MU) joint beamforming on the one or more signals to one or more UEs based upon the determined and compensated time delay.

12. The BS of claim 11, wherein the at least one hardware controller is configured to:
perform a virtualization of the one or more antenna array in accordance with a 2 dimensional (2D) plane associated with a signal generated from a precoder;
update the precoder in accordance with an estimation of a plurality of channels, wherein the estimation of the plurality of channels is performed on a per resource block (RB) basis; and
transmit the one or more signals at the one or more antenna arrays to the plurality of UEs using the FD-MIMO beamforming scheme.

13. The BS of claim 12, wherein updating the precoder comprises:
estimating one or more uplink channel, wherein the one or more uplink channel comprises one or more per frequency resource element (RE) in accordance with a per RB based precoder generation associated with one or more sounding reference signal (SRS);
assigning four SRS symbols to two radio sub-frames included in the radio frame each of which includes two SRS symbols; and
predicting a channel quality indicator (CQI) to compensate a difference between a CQI received from the plurality of UEs and a desired CQI using a gain difference value between a beamformed gain and a virtualized gain.

14. The BS of claim 12, further comprising:
performing precoding using a low complexity precoding scheme that reduces K times of matrix inversion to 1 time and an N×N dimension of matrix inversion to a K×K, wherein the low complexity precoding scheme is determined in accordance with a channel matrix that is approximated by a precoding matrix indicator (PMI) and a signal to interference noise ratio (SINR) that is obtained after mapping of a CQI feedback.

15. The BS of claim 14, wherein the K is determined as a number of UEs being served and the N is determined as a number of antennas to be used to transmit antenna beams to the UEs.

16. The BS of claim 11, wherein the large scale antenna array comprises a plurality of vertically arranged panels each of which includes a plurality of sub-arrays that is arranged in an n number horizontal ×1 vertical configuration, each of the sub-arrays including a plurality of patch elements fed with a corporate feed network.

17. The BS of claim 11, wherein the hardware controller is further configured to perform a timing and phase alignment for distributed radio frequency units that connect a base band unit of the BS through separate common public radio interface connections.

18. The BS of claim 11, wherein the large scale antenna array comprises one or more virtualization pattern including one or more time domain symbol and multiple virtualized symbols, the large scale antenna array activating one or more antenna element.

19. The BS of claim 11, wherein a scrambling identification (SCID) is allocated into one or more demodulation reference signal (DMRS) port that is mapped to one or more co-scheduled UEs sharing the same time resources and the same frequency resources.

20. The BS of claim 11, wherein the at least one hardware controller is further configured to compensate for the detected delay differences within the channels in the plurality of CPRI connections to less than 1 nanosecond.

\* \* \* \* \*